(12) United States Patent
Carter et al.

(10) Patent No.: US 9,781,174 B2
(45) Date of Patent: Oct. 3, 2017

(54) METHODS AND SYSTEMS FOR ELECTRONIC COMMUNICATIONS FEEDBACK

(71) Applicant: FUJI XEROX CO., LTD., Tokyo (JP)

(72) Inventors: Scott Carter, Mountain View, CA (US); Laurent Denoue, Veneto (IT); Matthew Cooper, San Francisco, CA (US)

(73) Assignee: FUJI XEROX CO., LTD., Tokyo (JP)

(*) Notice: Subject to any disclaimer, the term of this patent is extended or adjusted under 35 U.S.C. 154(b) by 77 days.

(21) Appl. No.: 14/860,407

(22) Filed: Sep. 21, 2015

(65) Prior Publication Data
US 2017/0085600 A1    Mar. 23, 2017

(51) Int. Cl.
H04L 29/06    (2006.01)

(52) U.S. Cl.
CPC ...... H04L 65/4015 (2013.01); H04L 65/1089 (2013.01); H04L 65/403 (2013.01); H04L 65/80 (2013.01)

(58) Field of Classification Search
CPC .................. H04L 65/1083; H04L 65/1046
See application file for complete search history.

(56) References Cited

U.S. PATENT DOCUMENTS

| | | | |
|---|---|---|---|
| 9,549,152 B1* | 1/2017 | Nayyar | H04N 7/15 |
| 2014/0269401 A1* | 9/2014 | Gondi | H04L 43/0876 370/253 |
| 2015/0002618 A1* | 1/2015 | Meek | H04N 7/15 348/14.09 |
| 2015/0215365 A1* | 7/2015 | Shaffer | H04L 65/80 370/252 |
| 2016/0073056 A1* | 3/2016 | Katzman | H04N 7/15 348/14.07 |
| 2016/0073059 A1* | 3/2016 | Bader-Natal | H04N 7/15 348/14.03 |
| 2016/0241627 A1* | 8/2016 | Ortega | H04L 65/80 |

* cited by examiner

*Primary Examiner* — Duc C Ho
(74) *Attorney, Agent, or Firm* — Morgan, Lewis & Bockius LLP

(57) ABSTRACT

The various embodiments described herein include methods and systems for providing electronic feedback. In one aspect, a method for providing feedback to a first participant is performed at a first client device. The method includes: (a) participating in an electronic conference with remote participant(s), the conference including an outgoing communications stream for the first participant; and (b) receiving feedback corresponding to a quality of the first participant's outgoing communications stream at a client device used by the particular participant. In another aspect, a method for providing feedback from a first participant is performed at a first client device. The method includes: (a) participating in an electronic conference with remote participant(s); (b) receiving a respective outgoing communications stream sent by a second client device used by a particular participant to participate in the conference; (c) analyzing the stream to determine quality factor(s); and (d) providing feedback based on the quality factor(s).

20 Claims, 25 Drawing Sheets

METHODS AND SYSTEMS FOR ELECTRONIC COMMUNICATIONS FEEDBACK

TECHNICAL FIELD

The present application relates generally to electronic communications, including, but not limited to, generating and analyzing electronic conferencing feedback.

BACKGROUND

Electronic communications have increased dramatically in recent years. These communications rely on combinations of various programs, devices, and networks. Due to the involvement of multiple software and hardware components, issues may arise that are difficult to detect and/or troubleshoot. Thus, it is a challenge to generate and analyze feedback for these electronic communications in a meaningful and accurate manner.

SUMMARY

Accordingly, there is a need for systems, devices, and methods for generating and/or analyzing feedback for electronic communications. In various implementations, the disclosed systems, devices, and methods complement or replace conventional systems, devices, and methods for generating and/or analyzing feedback.

(A1) In one aspect, some implementations include a method for providing conferencing feedback to a first participant. The method is performed at a first client device with one or more processors and memory coupled to the one or more processors. The method includes participating in an electronic conference with one or more remote participants, the electronic conference including an outgoing communications stream for the first participant. The method further includes receiving feedback from a particular participant of the one or more remote participants, the feedback corresponding to a quality of the first participant's outgoing communications stream at a client device used by the particular participant to participate in the electronic conference.

(A2) In some implementations of the method of A1: (a) the first client device includes a display; and (b) the method further includes (1) displaying a graphical user interface (GUI) on the display of the first client device, the GUI including display of information for the electronic conference; and (2) updating the displayed GUI to include display of information corresponding to the received feedback.

(A3) In some implementations of the method of A2, updating the displayed GUI includes updating a display characteristic of one or more icons within the displayed GUI (e.g., icon color), the one or more icons corresponding to one or more respective forms of communication (e.g., audio, video, text).

(A4) In some implementations of the method of any one of A2-A3: (a) the displayed GUI includes a video stream corresponding to the particular participant; and (b) where updating the displayed GUI includes updating a display characteristic of the video stream corresponding to the particular participant.

(A5) In some implementations of the method of any one of A2-A4: (a) the displayed GUI includes a video stream corresponding to the first participant; and (b) where updating the displayed GUI includes updating a display characteristic of the video stream corresponding to the first participant.

(A6) In some implementations of the method of any one of A2-A5, updating the displayed GUI includes displaying a text message within the GUI. In some implementations, the text message appears in a separate window.

(A7) In some implementations of the method of any one of A1-A6: (a) the first client device includes one or more speakers; and (b) the method further includes providing audio notification via the one or more speakers of the first client device, the audio notification corresponding to the received feedback. In some implementations, the audio notification includes at least one of: artificial static, beeps, words, and the like. In some implementations, the method includes aggregating feedback from multiple participants and modulating the audio signal based on aggregate feedback.

(A8) In some implementations of the method of any one of A1-A7, participating in the electronic conference comprises participating in the electronic conference via a web browser on the first client device.

(A9) In some implementations of the method of any one of A1-A8, the electronic conference comprises a peer-to-peer electronic conference.

(A10) In some implementations of the method of any one of A1-A9, the method includes troubleshooting one or more problems with the electronic conference by utilizing respective feedback received from one or more participants of the electronic conference.

(B1) In another aspect, some implementations include a method for providing conferencing feedback from a first participant. The method is performed at a first client device with one or more processors and memory coupled to the one or more processors. The method includes: (a) participating in an electronic conference with one or more remote participants; (b) receiving a respective outgoing communications stream sent by a second client device used by a particular participant of the one or more remote participants to participate in the electronic conference; (c) analyzing the received communications stream to determine one or more quality factors for the received communications stream; and (d) providing feedback to the particular participant based on the determined one or more quality factors.

(B2) In some implementations of the method of B1, the method includes rendering information corresponding to the received communications streams at the first client device; where analyzing the received communications stream to determine one or more quality factors for the received communications stream includes analyzing the rendered information.

(B3) In some implementations of the method of any one of B1-B2, the respective outgoing communications stream includes one or more channels for participant communications, the one or more channels including at least one of: a channel for text communications; a channel for audio communications; a channel for visual communications; and a channel for multimedia communications.

(B4) In some implementations of the method of B3, providing feedback to the particular participant includes providing feedback via a channel distinct from the one or more channels for participant communications. In some implementations, the feedback is transmitted via a channel used to establish the teleconference. In some implementations, the feedback is transmitted via the channel determined to be most reliable. In some implementations, the feedback is transmitted via the channel determined to be the lowest bandwidth.

(B5) In some implementations of the method of any one of B3-B4: (a) the respective outgoing communications stream includes two or more channels for participant communications; (b) analyzing the received communications stream includes analyzing each of the two or more channels; and (c) the method includes (1) determining an optimal channel based on the analysis of each of the two or more channels; and (2) promoting the optimal channel to the first participant. In some implementations, promoting the optimal channel includes automatically switching to the optimal channel. In some implementations, promoting the optimal channel includes suggesting to the first participant that the first participant switch to the optimal channel.

(B6) In some implementations of the method of any one of B3-B5: (a) the respective outgoing communications stream comprises two or more channels including a first channel designated as a primary channel; and (b) the method further comprises, in accordance with a determination that the first channel is faulty, designating a second channel of the two or more channels as the primary channel.

(B7) In some implementations of the method of any one of B1-B6, analyzing the received communications stream includes: (a) analyzing an audio stream within the received communications stream; and (b) determining at least a subset of the one or more quality factors based on the analyzed audio stream.

(B8) In some implementations of the method of any one of B1-B7, analyzing the received communications stream includes: (a) analyzing a video stream within the received communications stream; and (b) determining at least a subset of the one or more quality factors based on the analyzed video stream.

(B9) In some implementations of the method of any one of B1-B8, analyzing the received communications stream includes: (a) comparing an audio stream within the received communications stream with a video stream within the received communications stream; and (b) determining at least a subset of the one or more quality factors based on the comparison.

(B10) In some implementations of the method of any one of B1-B9, analyzing the received communications stream includes analyzing at least one of: a latency corresponding to the received communications stream; a volume corresponding to the received communications stream; and a refresh rate corresponding to the received communications stream.

In yet another aspect, some implementations include a system with one or more processors and memory coupled to the one or more processors, the memory storing one or more programs configured to be executed by the one or more processors, the one or more programs including instructions for performing any of the methods described herein (e.g., A1-A10 described above).

In yet another aspect, some implementations include an electronic device with one or more processors and memory coupled to the one or more processors, the memory storing one or more programs configured to be executed by the one or more processors, the one or more programs including instructions for performing any of the methods described herein (e.g., A1-A10 described above).

In yet another aspect, some implementations include a non-transitory computer-readable storage medium storing one or more programs for execution by one or more processors of a device, the one or more programs including instructions for performing any of the methods described herein (e.g., A1-A10 described above).

BRIEF DESCRIPTION OF THE DRAWINGS

Like reference numerals refer to corresponding parts throughout the drawings.

DESCRIPTION OF IMPLEMENTATIONS

Figure 1:
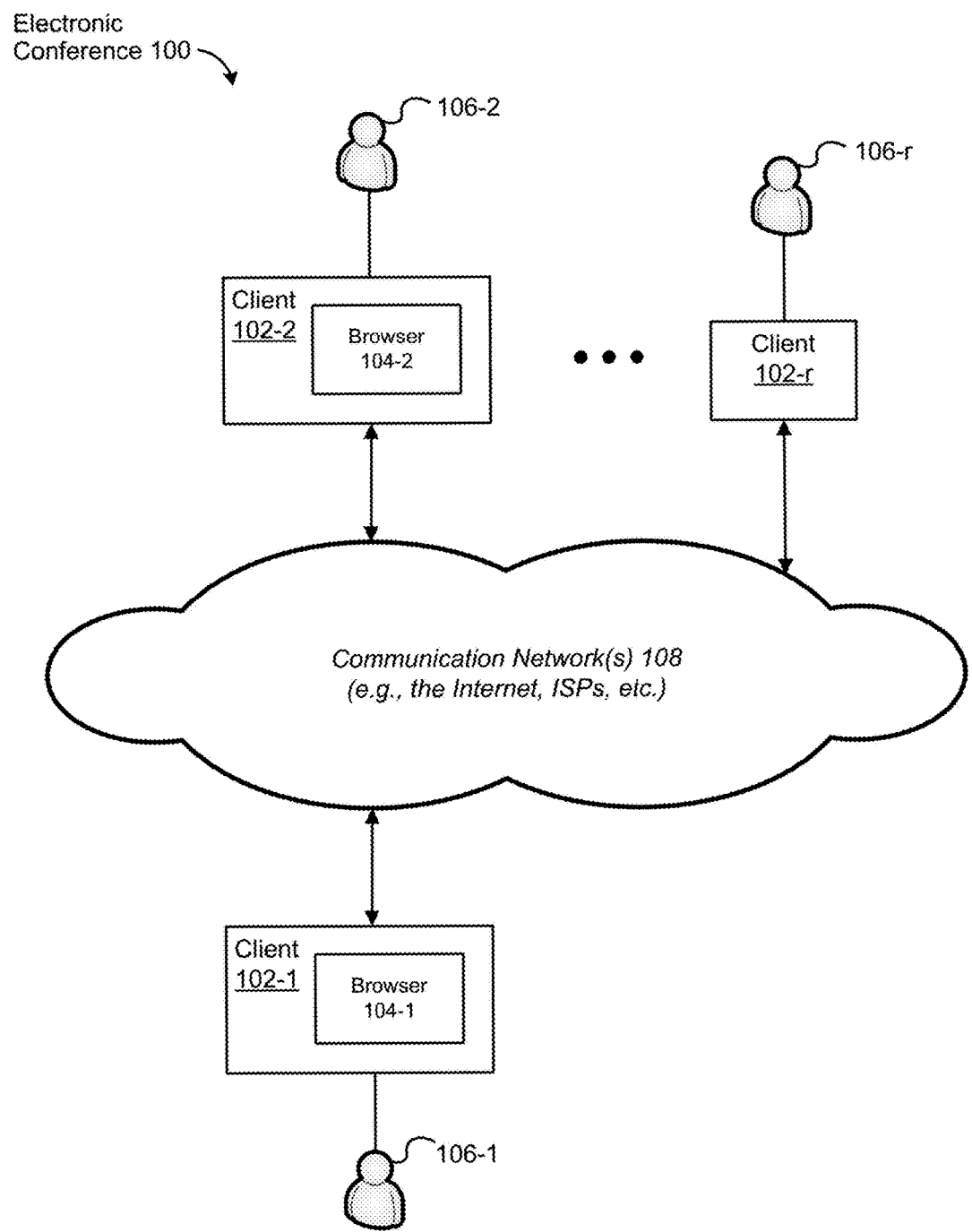
FIG. 1 is a block diagram illustrating exemplary electronic conference architecture in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

A lack of feedback of streaming media status and quality hinders conversations in teleconferences. When collocated, meeting participants rely on subtle cues to determine that the other participants can understand them. But these cues are often absent in remote meetings, in which the media streams are necessarily limited. Without these cues, it is hard to tell if others can understand them or can even hear or see them at all. Participants therefore regularly interrupt their conversation to check that the teleconferencing system is accurately conveying their dialog and gestures. Therefore it is advantageous to automatically detect the quality of the local media on the remote site and then feed that information back to the local site. This allows meeting participants to more accurately gage the quality of the communication channels at the other participants' sites. In some implementations, participants can then adjust to these constraints. In some implementations, the system can adjust to the constraints automatically, without interrupting the flow of conversation. In some implementations, the system provides visual and/or audio cues to the user to notify the user of quality issues. For example, the system shows a remote person in grey-scale to indicate a deterioration of the corresponding communication channel.

A problem with teleconferences is the quality of the network connection between clients. A poor connection can render some or all of the media channels used in a teleconference effectively useless. However, even when a channel fails, if one or more alternate channels remain available then participants on either side can adapt and continue the meeting. Thus, the beginning of many meetings includes a period of establishing an understanding of the connectivity issues on each side. In many meetings each side will ask the other, either via audio or instant message, "Can you see us? Can you hear us? Are you receiving chat messages", etc., to establish which channels can be used and either fix those that are not working or adapt as best as possible. This period of negotiation can go on for some time, especially if the channel that is used for the negotiation is itself faulty.

The present disclosure describes a system that automatically determines the quality of each local channel at each remote site using content analysis techniques. In some implementations, this analysis occurs after the remote client renders each media stream. Checks at any other point in the process are incomplete and therefore more likely to be incorrect. For example, the network bandwidth might be perfect but that would not matter if the remote client's speaker has failed. In some implementations, that information is then conveyed to remote clients using a reliable, lowest bandwidth channel available in the meeting. (By definition, there exists some active data channel otherwise the meeting could not have been initialized.) In some implementations, the information about the quality of channels at remote sites is then conveyed to local participants via notifications. In some implementations, changes in the quality of media channels are conveyed in real time. Furthermore, in some implementations, the system offers suggestions for switching to other channels when it detects that one channel is faulty, or switches channels automatically.

A conference can be viewed as a collection of directional participant pairs (e.g., one pair of channels for each pair of participants). In some implementations, each directional participant pair has three states per media channel: NO DATA, LOCAL DATA ONLY, and REMOTE DATA. For example, initially, neither audio nor video works on the local machine and the state for both is NO DATA. When the local machine detects data on a channel, it moves to the respective channel to the next state, LOCAL DATA ONLY. In various implementations, the system indicates that state change in a number of ways, such as turning a microphone icon from gray to green; or showing the local video live in the local participant's window. When the remote machine detects that it is receiving data on a channel it can feed that information back to the local client, which in turn moves the state for that channel to REMOTE DATA. In some implementations, this is indicated by separate icons near the remote user's stream. If the remote machine has the computational resources to determine a quality score for a given channel, it can feedback a quality rating, rather than just a boolean, which can be visualized (e.g., as a color indicator).

In some implementations, each client runs local analysis methods on each remote stream and forwards its findings back to the remote machine via messages conveyed on a data channel. In some implementations, this system is a state machine and there is a state for each directional pair of client channels. Thus, if there are two clients and two channels (audio and video) then there are a total of four states: the quality of the first client's audio stream on the second client; the quality of the first client's video stream on the second client; the quality of the second client's audio stream on the first client; and the quality of the second client's video stream on the first client. Even though the number of states is exponential, the computational demands per client is (channels*participants−1) and the computations themselves can be relatively inexpensive.

In various instances, any number of issues can degrade streaming media, from the network, to the local machine, to the browser itself. The only way to determine what users at a remote site actually experience is to analyze the streams after they have made it all the way to the presentation layer (e.g., pixels on a screen or audio from the speaker).

Some implementations make use of a voice activity detection module. It provides each client with events that indicate whether a local speaker is detected as audible. There are numerous options and approaches to providing this functionality. For example, some implementations include steps for determining the remote quality of the local audio channel, stepping through each state: NO DATA, LOCAL DATA, and REMOTE DATA.

NO DATA: In this state the first client has not yet detected that its microphone is on.

LOCAL DATA ONLY: When the first client's audio analysis engine detects voice on the local microphone, an event is sent to the other clients. In this state the first client is sending audio but that the other clients are not receiving it.

REMOTE DATA: If another client's voice activity detection module detects audio from the first client it sends an event back to the first client. In this state audio is functioning for that local client/remote client pair. In some implementations, after a timeout of N seconds the system will degrade from state REMOTE DATA to state LOCAL DATA ONLY. That is, if a client is in state REMOTE DATA then if the first client sends a voice event to the other client and then if N seconds pass with no response from the second client, the state for that directional pair goes back to LOCAL DATA ONLY. This processing executes on each client pair to verify full connectivity.

In some implementations, the same approach is used for any media channel traveling in any direction. For example, a simple video channel analysis tool evaluates locally whether any non-black pixels are being received from a remote stream. In some implementations, more sophisticated analysis methods are utilized to go beyond a state machine to determine the quality of the stream. In some implementations, this involves making use of volume or energy features of the received audio. For example, the voice activity detection module can be configured to provide the volume in decibels of the captured audio. The volume or its variation over time is sampled from the audio signal or a local microphone and used as a proxy for quality under the assumption there is limited background noise during meetings. Some implementations utilize a stats API for collecting statistics on the quality of the streams being shared between clients in terms of packets successfully sent and received. In some implementations, simple pixel differencing is used to detect the remote refresh rate.

There are many different possible methods to notify meeting participants of the quality of each stream's representation at remote clients, including text or icons. Another approach is to automatically promote a functional stream to compensate for a non-functional one. For example, a chat window could automatically appear if the audio channel has failed. If video has failed, the system can revert to sending individual frames at a low frequency.

Communicating delay status, while useful feedback, does not give the local users any indication of the quality of their streams on the remote device. In particular, it does not include any local processing of remote streams, which is necessary to determine the actual quality level of local content at the remote site.

Attention is now directed to the figures. FIG. 1 is a block diagram illustrating electronic conference architecture 100 in accordance with some implementations. Electronic conference architecture 100 includes multiple clients 102 (e.g., clients 102-1, 102-2, and 102-r), each operated by a respective user 106 (e.g., users 106-1, 106-2, and 106-r). Users are sometimes also called "participants" in reference to participating in an electronic communication such as an electronic conference. There is not necessarily a one-to-one correspondence between the client devices 102 and the users 106. A client 102 optionally includes a browser 104 (e.g., browsers 104-1 and 104-2). Clients 102 are communicatively coupled via communication network(s) 108, such as the Internet. In some implementations, one or more of the client devices 102 are mobile devices and the electronic conference comprises a conference call.

A client 102 (sometimes also called a "client device" or a "client computer") may be any computer or similar device through which a user 106 of the client 102 can remotely communicate with users of other clients 102. Examples of client devices include desktop computers, notebook computers, tablet computers, mobile phones, personal digital assistants, set-top boxes, or any combination of the above. A client 102 typically runs client applications 326, which can enable/enhance communication between the respective user 106 and one or more remote clients. For example, some clients include a web browser 104 or other type of application that permits a user 106 to search for, browse, and/or use resources (e.g., webpages and web services) accessed from one or more server systems and/or one or more client devices over the communication network 108. In some implementations, the client device 102 includes voice-over-IP (VoIP) software utilized in the electronic conference.

In some instances, a client device 102 is a mobile device, such as a laptop computer or a smart phone. Users 106 commonly use mobile devices 102 to electronically communicate with other users.

The communication network 108 can be any wired or wireless local area network (LAN) and/or wide area network (WAN), such as an intranet, an extranet, the Internet, or a combination of such networks. In some implementations, the communication network 108 uses the HyperText Transport Protocol (HTTP) to transport information using the Transmission Control Protocol/Internet Protocol (TCP/IP). HTTP permits client computers to access various resources available via the communication network 108. The term "resource" as used throughout this specification refers to any piece of information and/or service that is accessible via a content location identifier (e.g., a URL) and can be, for example, a webpage, a document, a database, an image, a computational object, a search engine, or other online information service. In some implementations, the communication network 108 comprises a telephone network. In some implementations, the electronic conference comprises a telephone call.

Figure 2:
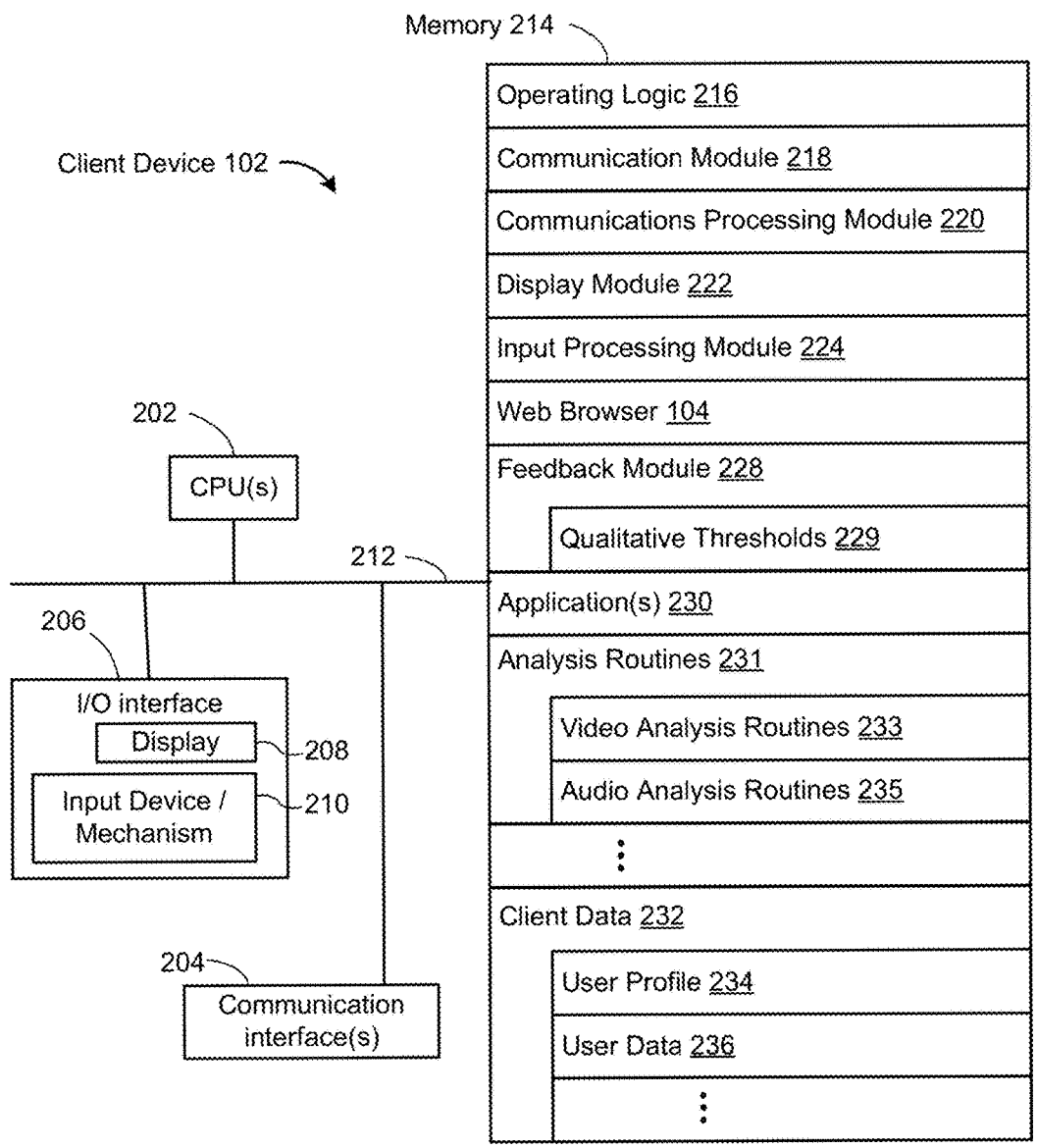
FIG. 2 is a block diagram illustrating an exemplary client device in accordance with some implementations.

FIG. 2 is a block diagram illustrating a client device 102 in accordance with some implementations. Client devices 102 include laptop computers, notebook computers, tablet computers, desktops computers, smart phones, and PDAs. A client device 102 includes one or more processing units (e.g., CPUs, ASICs, FPGAs, microprocessors, and the like) 202, one or more network interfaces 204, memory 214, an I/O interface 206, and one or more communication buses 212 (sometimes called a chipset) for interconnecting these components. The I/O interface 206 includes one or more output devices 208 that enable presentation of media content, including one or more speakers and/or one or more visual displays. The I/O interface 206 also includes one or more input devices 210, including user interface components that facilitate user input such as a keyboard, a mouse, a voice-command input unit or microphone, a touch screen display, a touch-sensitive input pad, a camera (e.g., for scanning an encoded image), a gesture capturing camera, or other input buttons or controls. Furthermore, some client devices 102 use a microphone and voice recognition or a camera and gesture recognition to supplement or replace the keyboard.

In some implementations, the client device 102 includes a location detection device, such as a GPS (global positioning satellite) or other geo-location receiver, for determining the location of the client device. In some implementations, the client device 102 includes one or more built-in sensors. In some implementations, the built-in sensors include, for example, one or more thermal radiation sensors, ambient temperature sensors, humidity sensors, IR sensors, ambient light sensors, motion detectors, accelerometers, and/or gyroscopes.

Communication interface(s) 204 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 214 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 214, or alternatively the non-volatile memory within memory 214, includes a non-transitory computer readable storage medium. In some implementations, memory 214, or the non-transitory computer readable storage medium of memory 214, stores the following programs, modules, and data structures, or a subset or superset thereof:

- operating logic 216 including procedures for handling various basic system services and for performing hardware dependent tasks;
- communication module 218 for connecting to and communicating with other network devices, such as a router that provides Internet connectivity, coupled to communication network(s) 108 via one or more communication interfaces 204 (wired or wireless);
- communications processing module 220 for processing communication streams during electronic communications in conjunction with communication interface(s) 204;
- display module 222, which receives input from the one or more input devices 210, and generates user interface elements for display on the display device 208;
- input processing module 224 for detecting one or more user inputs or interactions from one of the one or more input devices 210 and interpreting the detected input or interaction (e.g., processing an encoded image scanned by the camera of the client device);
- web browser 104, which enables a user to communicate over a network 108 (such as the Internet) with remote computers or devices;
- feedback module 228 for generating and analyzing feedback during electronic communications in conjunction with communication interface(s) 204. In some implementations, the feedback includes one or more numerical quality factors. In some implementations, feedback module 228 includes one or more qualitative thresholds 229 for assigning predetermined quality labels based on one or more quality factor(s);

one or more applications 230, which are configured for execution by client device 102. In various implementations, the applications 230 include a camera module, a sensor module, one or more games, application marketplaces, payment platforms, and/or social network platforms. In some implementations, one or more of the applications 230 run within the web browser 104;

one or more analysis routine(s) 231, which can be utilized to generate feedback (e.g., one or more quality factors) in conjunction with feedback module 228. In some implementations, the analysis routine(s) are invoked on a communication stream to generate a corresponding quality factor. In some implementations, the analysis routine(s) 231 include video analysis routines 233 for analyzing video communications and/or audio analysis routines 235 for analyzing audio communications; and client data 232, which includes information about the device 102 or users 106 of the device 102. In some implementations, the client data 232 includes one or more user profiles 234, which optionally includes user accounts, user preferences, user settings, login credentials for each user account, payment data (e.g., linked credit card information, app credit or gift card balance, billing address, shipping address) associated with each user account, custom parameters (e.g., age, location, hobbies), and/or user contacts, such as social network contacts. In some implementations, the client data 232 includes user data, which logs user activity on the client device.

Each of the above identified elements in FIG. 2 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 214 stores a subset of the modules and data structures identified above. For example, feedback module 228 is optionally combined with communications processing module 218 and/or communication module 218. Furthermore, the memory 214 may store additional modules or data structures not described above. For example, an audio module for processing audio data during electronic communications in conjunction with communication interface(s) 204 and/or I/O interface 206.

Although FIG. 2 illustrates a client device 102, FIG. 2 is intended more as functional illustration of the various features that may be present in client devices rather than as a structural schematic of the implementations described herein. In practice, and as recognized by those of ordinary skill in the art, items shown separately could be combined and some items could be separated.

Figure 3A:
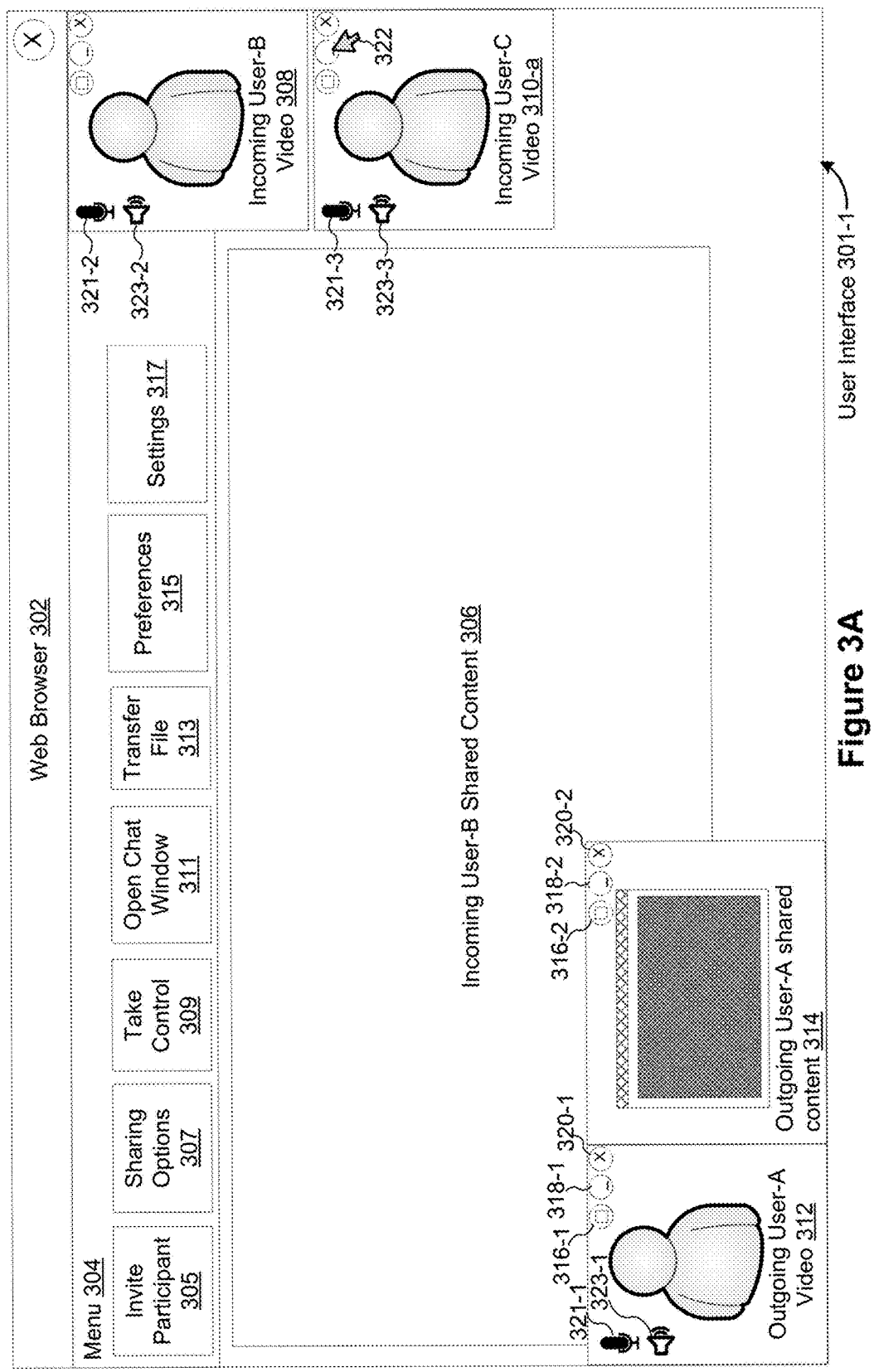
FIGS. 3A-3D illustrate exemplary user interfaces for electronic communications in accordance with some implementations.

FIGS. 3A-3D illustrate exemplary user interfaces (UIs) for electronic communications in accordance with some implementations. FIG. 3A shows web browser 302 with user interface 301-1. User interface 301-1 is displayed on a client device (e.g., client device 102-1) corresponding to User-A. User interface 301-1 includes menu 304, displayed incoming content, and displayed outgoing content. The displayed incoming content includes incoming User-B shared content 306 (e.g., User-B's screen/desktop or a particular window therein), incoming User-B video 308, and incoming User-C video 310-a. In some implementations, the displayed incoming content includes incoming User-C shared content (not shown). The displayed outgoing content includes outgoing User-A video 312 and outgoing User-A shared content 314. The menu 304 optionally includes an "invite participant" affordance 305, a "sharing options" affordance 307, a "take control" affordance 309, an "open chat window" affordance 311, a "transfer file" affordance 313, a "preferences" affordance 315, and a "settings" affordance 317. In FIG. 3A, displayed incoming User-B shared content 306 is emphasized (e.g., enlarged compared to other content).

In some implementations, the menu 304 includes a subset, or superset, of the affordances shown in FIG. 3A. In some implementations, the displayed outgoing/incoming content is based on one or more user preferences (e.g., user preferences for User-A). In some implementations, the displayed outgoing/incoming content is based on one or more conference settings. In some implementations, the displayed outgoing/incoming content is based on the capabilities of one or more of the participants' client devices 102. In some implementations, the displayed outgoing/incoming content is based on the capabilities of communication network(s) 108. In some implementations, the displayed outgoing/incoming content is based on the communication streams available at the client device for User-A. In some implementations, the displayed outgoing/incoming content is based on the quality of the communication streams available at the client device for User-A.

In some implementations, displayed content corresponding to each user (e.g., User-A, User-B, and User-C) includes displayed information, such as one or more icons, indicating whether the particular user's audio and/or video devices are enabled or disabled. For example, FIG. 3A shows microphone icon 321-1 and speaker icon 323-1 corresponding to User-A, microphone icon 321-2 and speaker icon 323-2 corresponding to User-B, and microphone icon 321-3 and speaker icon 323-3 corresponding to User-C.

In some implementations, each instance of displayed incoming/outgoing content includes one or more icons for adjusting display of the corresponding content. For example, FIG. 3A shows displayed outgoing User-A video 312 with expand icon 316-1, minimize icon 318-1, and hide icon 320-1. FIG. 3A further shows displayed outgoing User-A shared content 314 with expand icon 316-2, minimize icon 318-2, and hide icon 320-2. Expand, minimize, and hide icons corresponding to displayed incoming User-B and User-C videos are also showed in FIG. 3A. In some implementations, other icons for adjusting the display of the corresponding content are included. In some implementations, distinct displayed content optionally has distinct icons.

In some implementations, the position of each instance of displayed incoming/outgoing content is adjustable. In some implementations, each instance of displayed incoming/outgoing content is within its own individual window within user interface 301-1. In some implementations, the position of each instance of displayed incoming/outgoing content is set by User-A and/or is based on one or more user preferences and/or one or more conference settings.

Figure 3B:
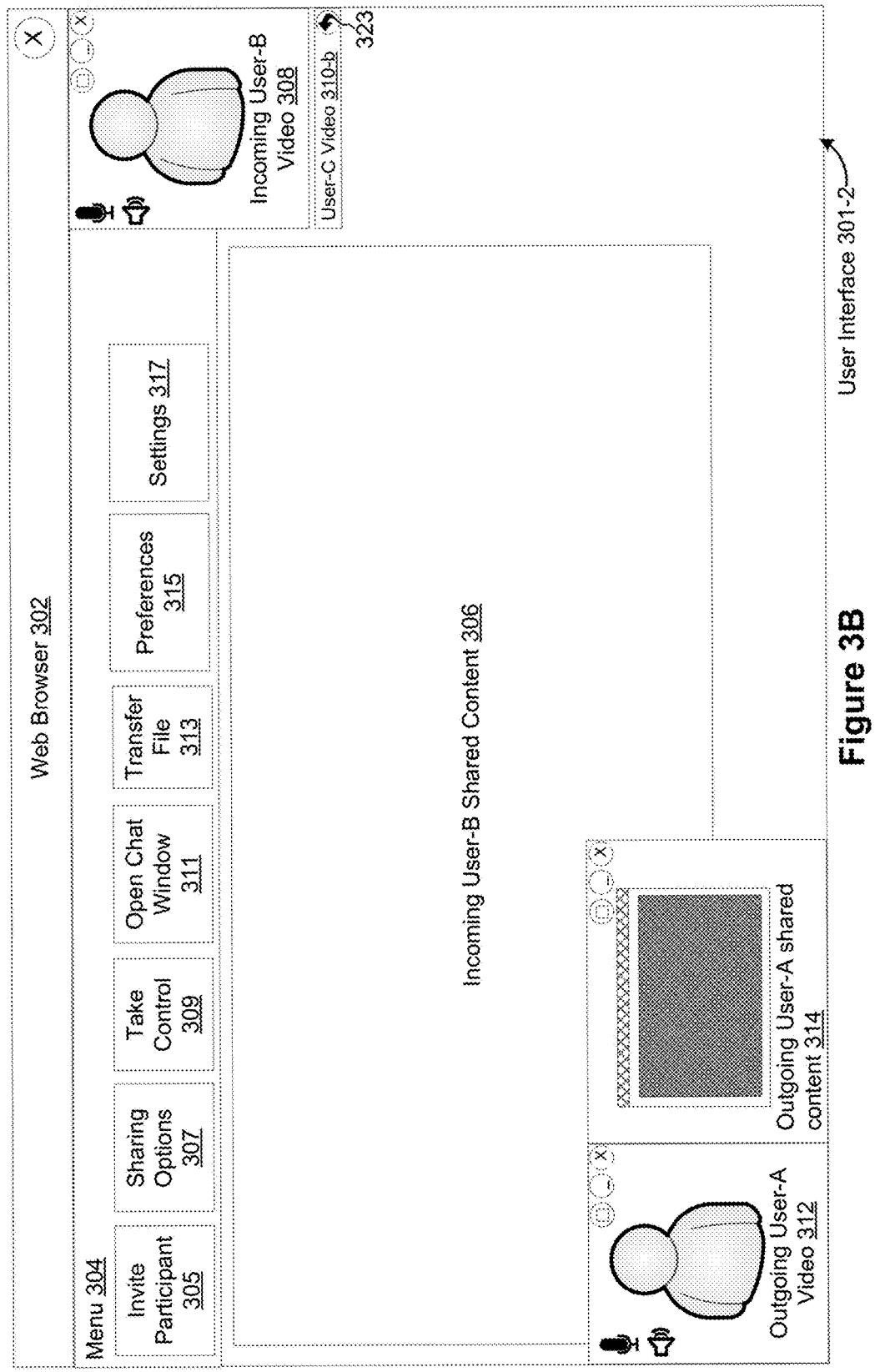

FIG. 3A further shows cursor 322 over the minimize icon corresponding to displayed incoming User-C video 310-a. In response to selection of the minimize icon, displayed incoming User-C video 310 is minimized. Accordingly, FIG. 3B shows user interface 301-2 including minimized User-C video 310-*b*. FIG. 3B further shows a restore icon 323 corresponding to the minimized User-C video 310-*b*. In some implementations, the position of minimized User-C video 310-*b* is adjusted (e.g., moved to the bottom of the user interface).

Figure 3C:
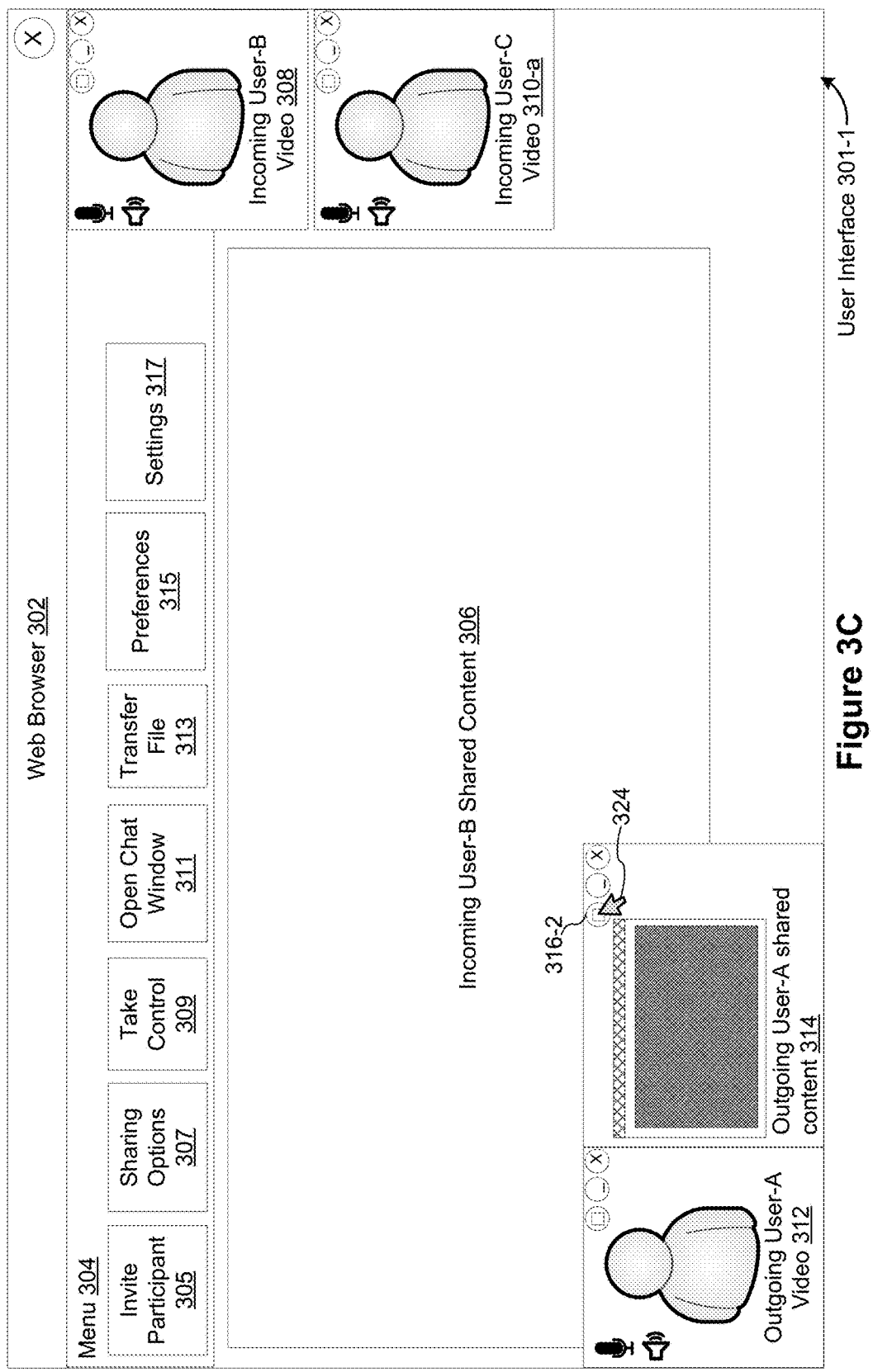
Figure 3D:
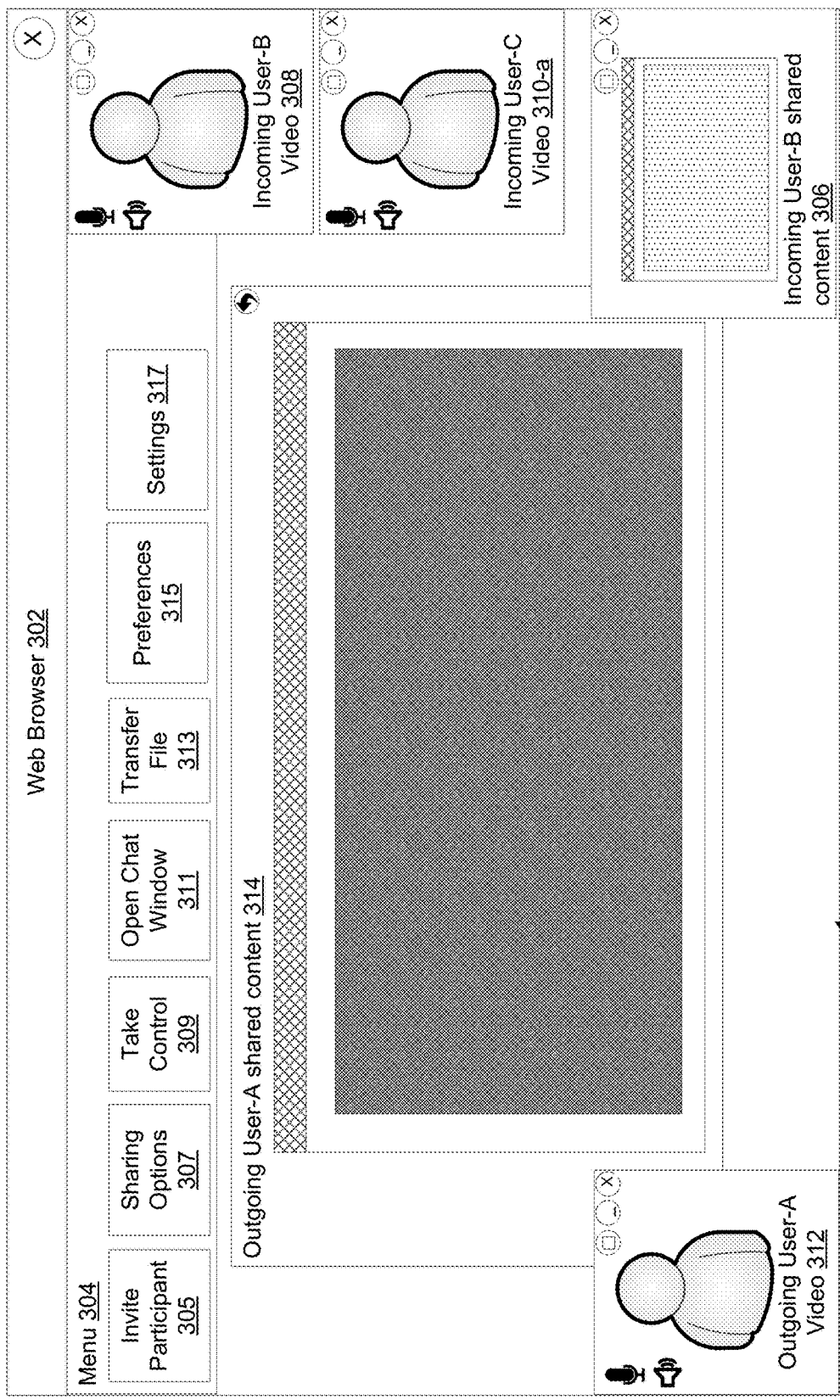

FIG. 3C shows user interface 301-1 with cursor 324 over expand icon 316-2. In response to selection of the expand icon 316-2, display of outgoing User-A shared content 314 is expanded (e.g., maximized). Accordingly, FIG. 3D shows user interface 301-4 with expanded display of outgoing User-A shared content 314. FIG. 3D also shows contracted display of incoming User-B shared content 306. Thus, in FIG. 3D, displayed outgoing User-A shared content 314 is emphasized.

Figure 4A:
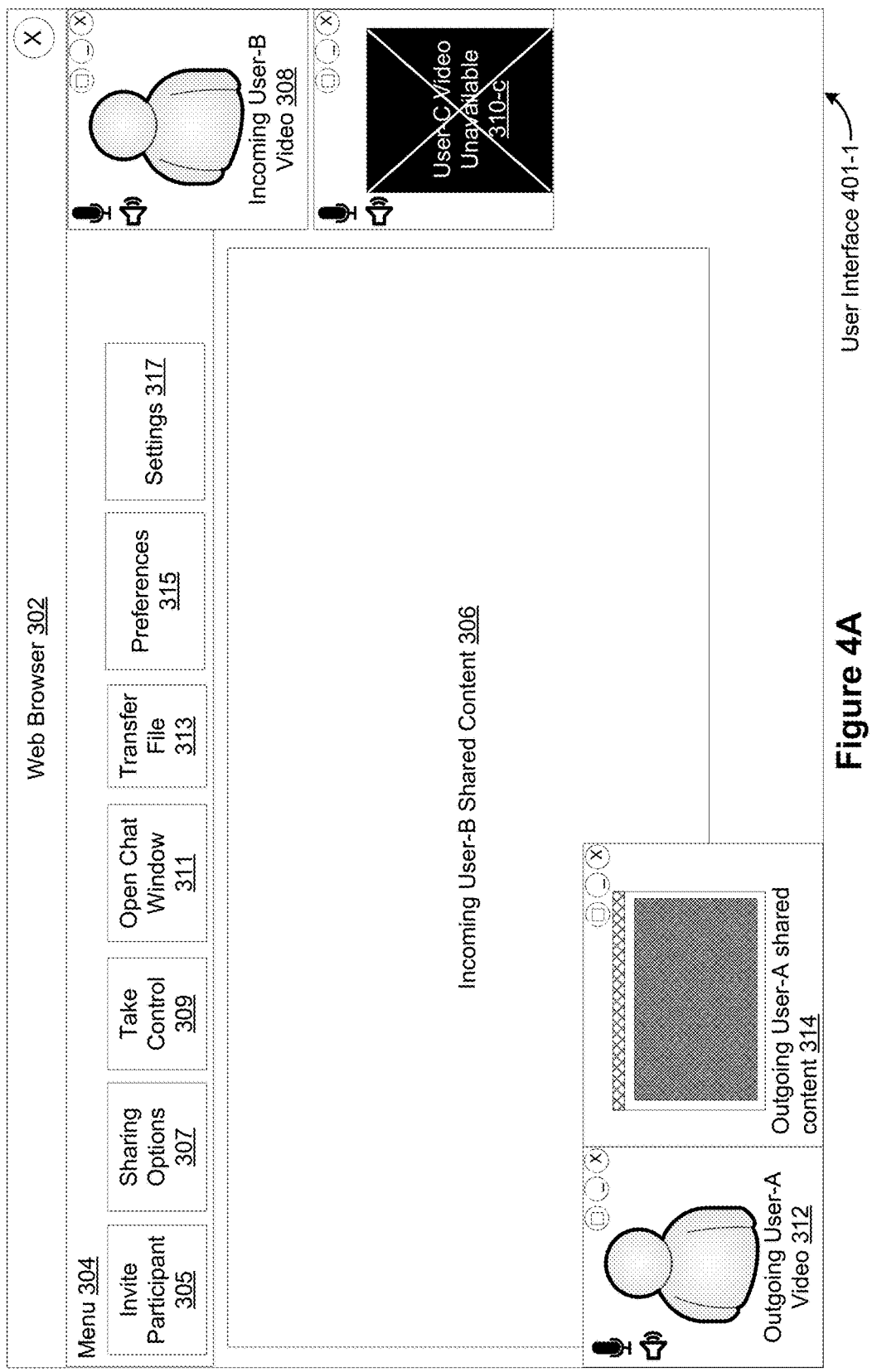
FIGS. 4A-4I illustrate exemplary user interfaces for displaying feedback for electronic communications in accordance with some implementations.

FIGS. 4A-4I illustrate exemplary user interfaces for displaying feedback for electronic communications in accordance with some implementations. FIG. 4A shows user interface 401-1. User interface 401-1 is the same as user interface 301-1, described above, except that incoming User-C video 310-*a* is not displayed. Rather, user interface 401-1 shows User-C video unavailable graphic 310-*c*. User-C video unavailable graphic 310-*c* indicates that there is a problem with User-C's video as received by User-A. In some instances, the problem is at User-C's client device, while in other instances, the problem is in the communication network(s) and/or User-A's client device. Although FIG. 4A shows the User-C video unavailable 310-*c* graphic 310-*c*, in some implementations, other graphics are used. In some implementations, no graphic is displayed.

Figure 4B:
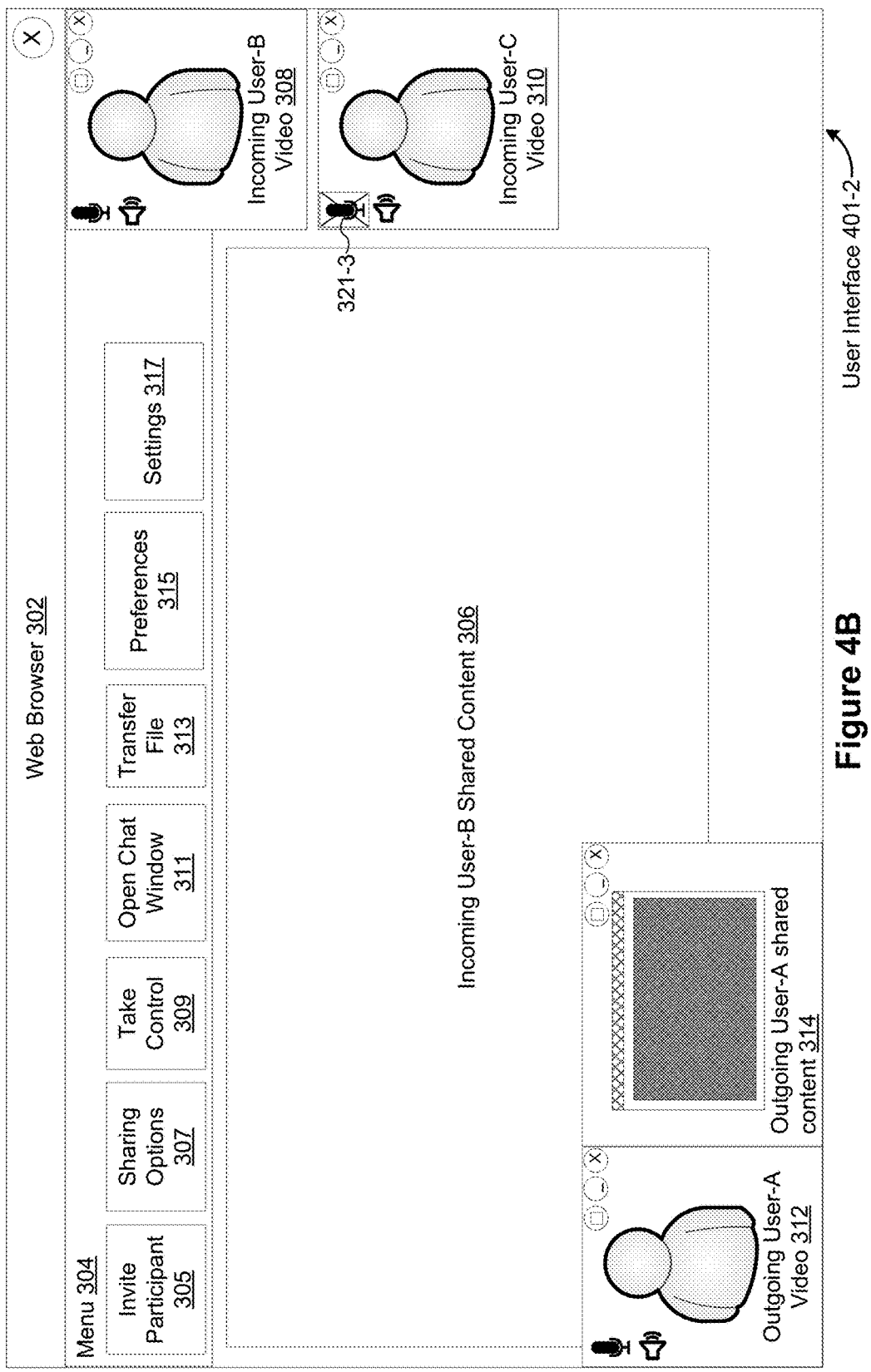

FIG. 4B shows user interface 401-2. User interface 401-2 is the same as user interface 301-1, described above, except that microphone icon 321-3 is shown as disabled. In some implementations, showing microphone icon 321-3 as disabled indicates that there is a problem with User-C's outgoing audio, as received by User-A. In some instances, User-C has disabled the microphone. In some instances, User-C does not have a microphone connected. In some instances, the problem is in the communication network(s) (e.g., communication network(s) 108, FIG. 1) and/or User-A's client device. In some instances, User-A has intentionally disabled User-C's audio.

Figure 4C:
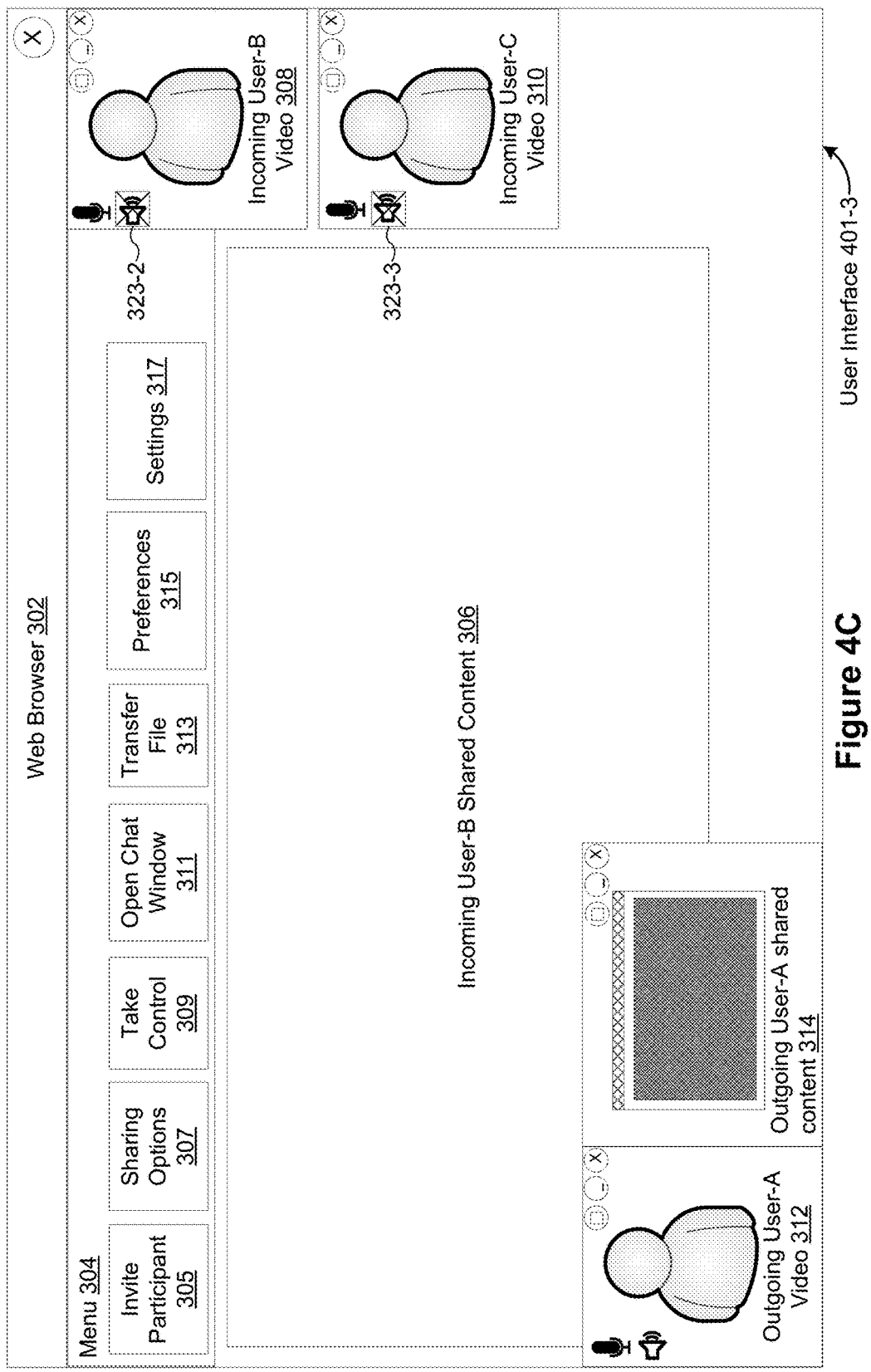

FIG. 4C shows user interface 401-3. User interface 401-3 is the same as user interface 301-1, described above, except that speaker icon 323-2 and speaker icon 323-3 are shown as disabled. In some implementations, showing a speaker icon as disabled indicates that there is a problem with the respective user's incoming audio. In some instances, the particular user has disabled the speaker(s). In some instances, the particular user does not have a speaker connected to his/her client device. In some instances, the problem is in the communication network(s) (e.g., communication network(s) 108, FIG. 1).

Figure 4D:
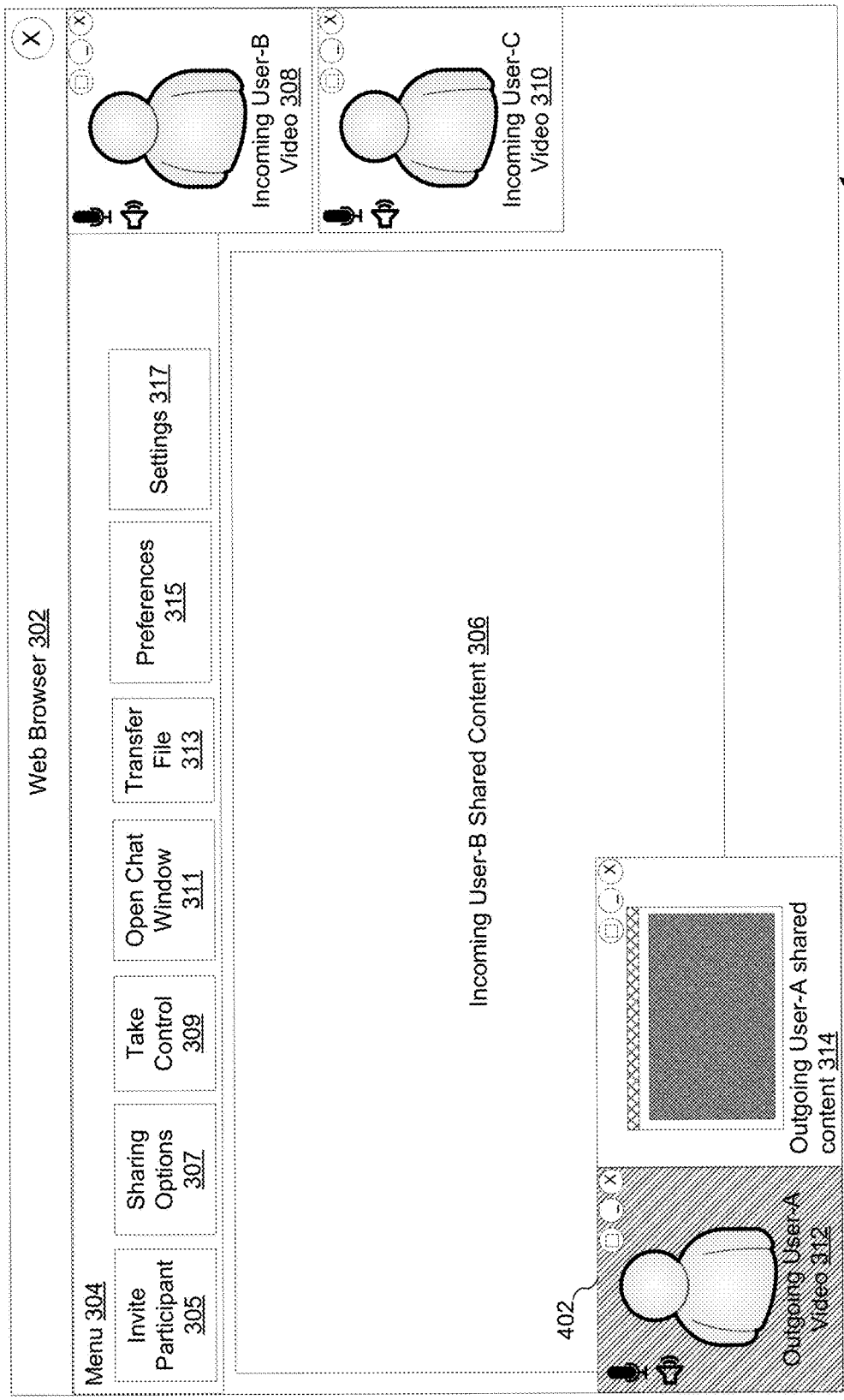

FIG. 4D shows user interface 401-4. User interface 401-4 is the same as user interface 301-1, described above, except that displayed outgoing User-A video 312 is shown with overlay 402. In some implementations, overlay 402 indicates that there is a problem with User-A's outgoing video, as received by another participant (e.g., User-B and/or User-C). In some instances, the problem is in one of: the communication network(s) (e.g., communication network(s) 108, FIG. 1), User-A's client device, and/or the other participant's client device. In some implementations, overlay 402 is displayed in response to receiving feedback from another participant (e.g., User-B and/or User-C). In some implementations, the overlay 402 includes artificial static. In some implementations, the overlay 402 includes interference lines.

Figure 4E:
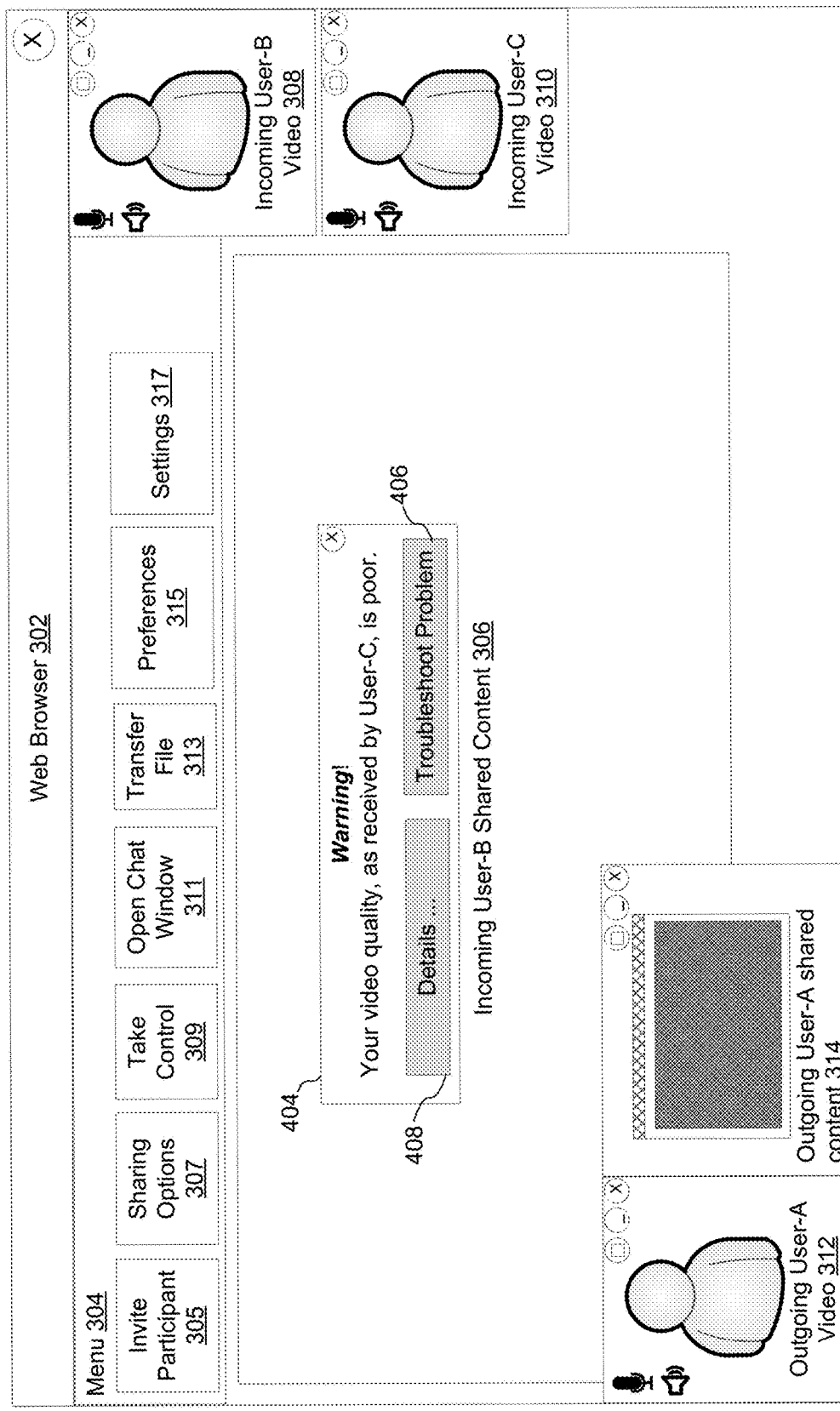

FIG. 4E shows user interface 401-5. User interface 401-5 is the same as user interface 301-1, described above, except that user interface 401-5 further includes warning 404. Warning 404 indicates that User-A's video, as received by User-C, is poor (e.g., high latency, low frame rate, missing or corrupted data, etc.). In some implementations, User-A's client device determines whether the video quality is poor based on feedback received from User-C. In some implementations, User-A's client device determines whether the video quality is poor by comparing it to the video quality for other participants. In some implementations, User-A's client device determines whether the video quality is poor by comparing it one or more user preferences and/or settings. FIG. 4E further shows warning 404 including a details affordance 408 for displaying additional information as to why the warning 404 was displayed. In some implementations, the additional information includes information regarding the video latency, frame rate, connection properties, and the like. FIG. 4E further shows warning 404 including troubleshoot affordance 406. Selecting the troubleshoot affordance 406 enables User-A to troubleshoot the video problem. In some implementations, troubleshooting includes checking User-A's video quality as received by other participants (e.g., as received by User-B). In some implementations, troubleshooting includes performing one or more diagnostic tests, such as pinging User-C, checking firewall settings, checking camera settings, analyzing User-A's outgoing video quality at User-A's client device, and the like.

Figure 4F:
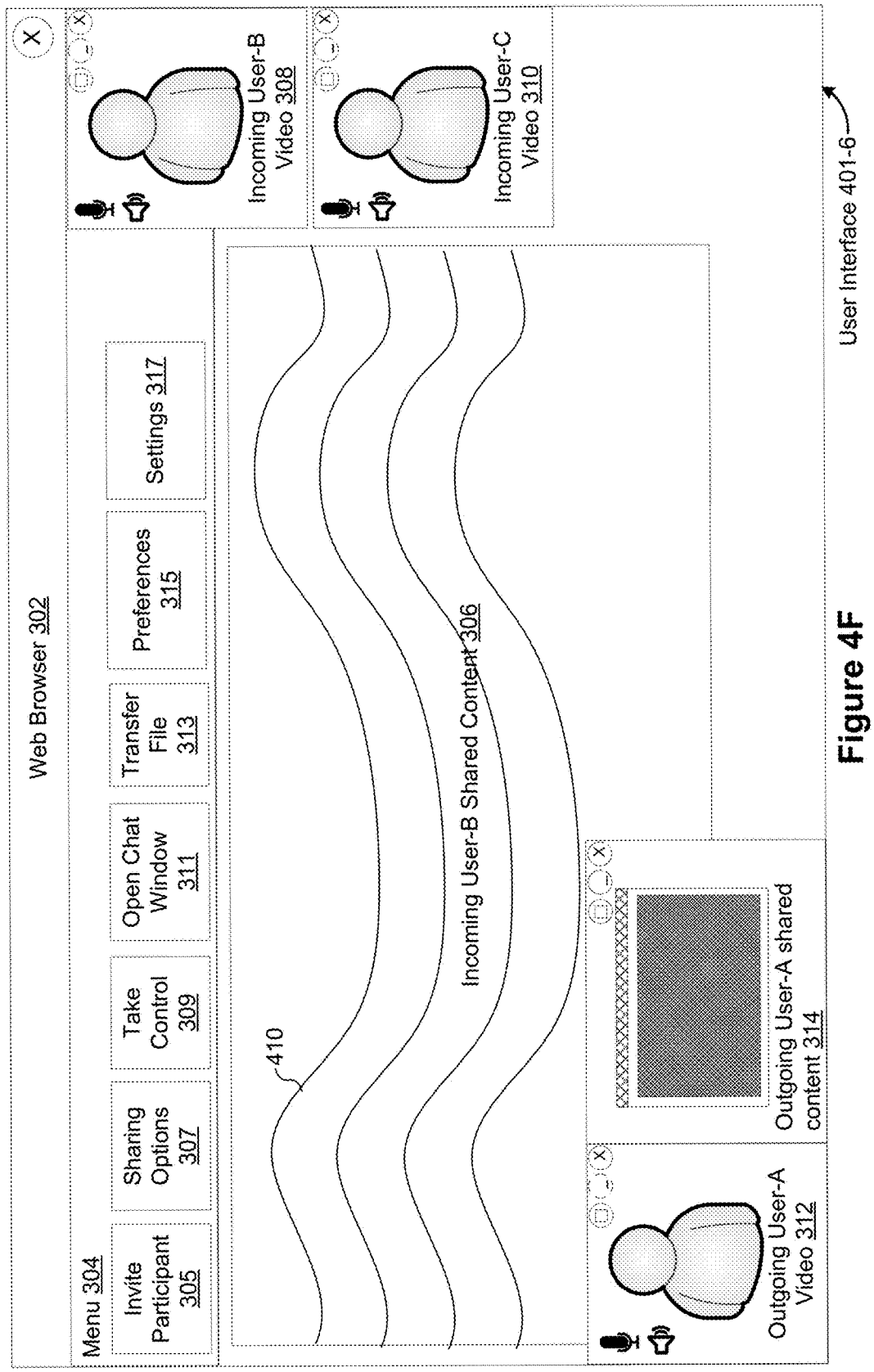

FIG. 4F shows user interface 401-6. User interface 401-6 is the same as user interface 301-1, described above, except that incoming User-B's shared content 306 is shown with overlay 410. In some implementations, overlay 410 indicates that there is a problem with User-A's outgoing content and/or video, as received by another participant (e.g., User-B and/or User-C). In some instances, the problem is in one of: the communication network(s) (e.g., communication network(s) 108, FIG. 1), User-A's client device, and/or the other participant's client device. In some implementations, overlay 410 is displayed in response to receiving feedback from another participant (e.g., User-B and/or User-C). In some implementations, the overlay 410 includes artificial static. In some implementations, the overlay 410 includes interference lines. In some implementations, overlay 410 indicates that there is a problem with User-B's shared content 306.

Figure 4G:
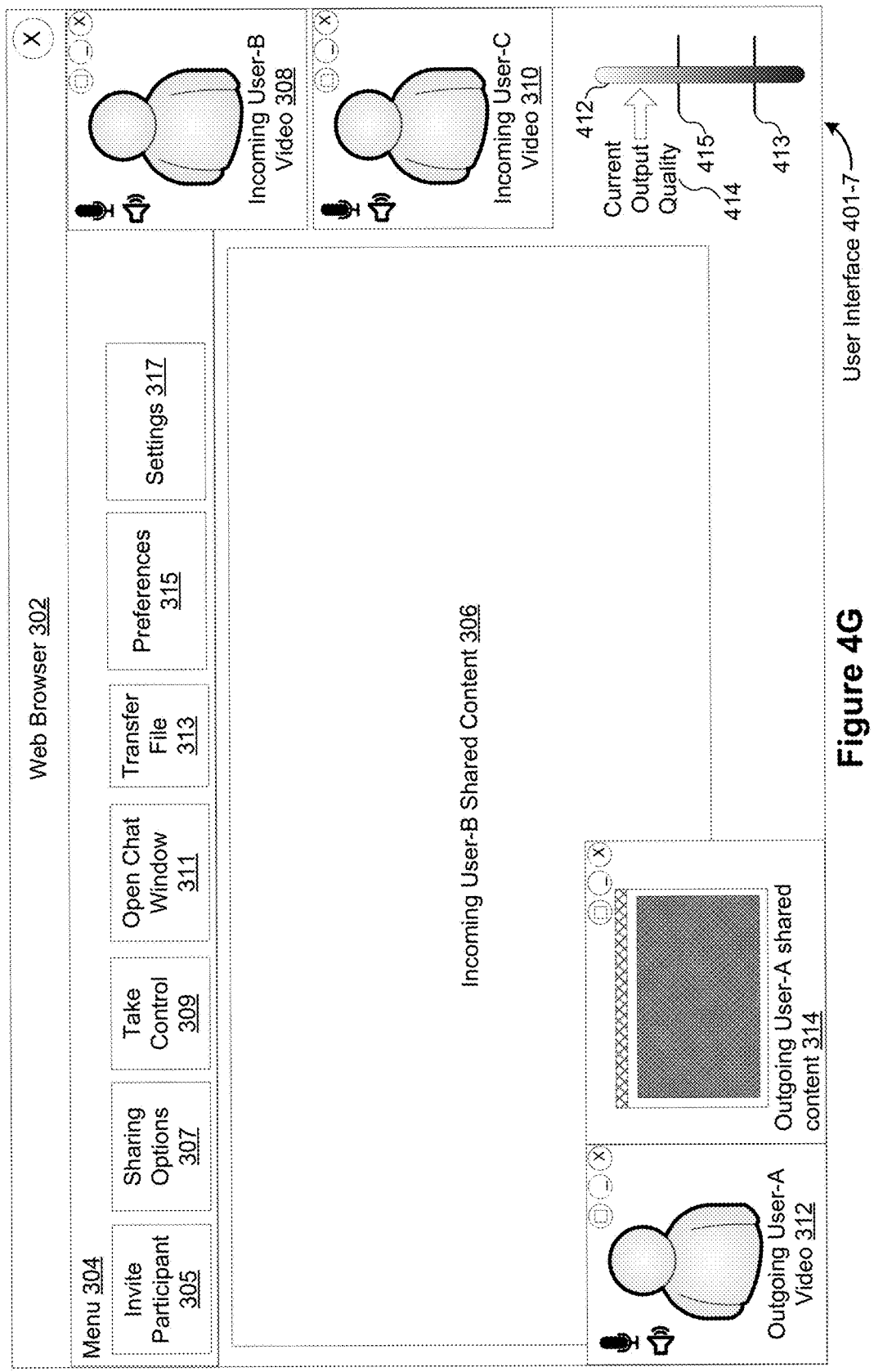

FIG. 4G shows user interface 401-7. User interface 401-7 is the same as user interface 301-1, described above, except that user interface 401-7 further includes output quality meter 412 and current quality indicator 414. In some implementations, the output meter 412 includes qualitative threshold indicators 413 and 415. In some implementations, the region below the qualitative threshold indicator 413 is labeled as "poor" quality. In some implementations, the region between the qualitative threshold indicators 413 and 415 is labeled "moderate" quality. In some implementations, the region above qualitative threshold indicator 415 is labeled "good" quality. Thus, in accordance with some implementations, FIG. 4G shows the current output quality indicator 414 in the "good" region. In some implementations, current quality indicator 414 indicates that there is a problem with User-A's outgoing content and/or video, as received by another participant (e.g., User-B and/or User-C). In some instances, the problem is in one of: the communication network(s) (e.g., communication network(s) 108, FIG. 1), User-A's client device, and/or the other participant's client device. In some implementations, current quality indicator 414 is displayed/updated in response to receiving feedback from another participant (e.g., User-B and/or User-C). In some implementations, current quality indicator 414 corresponds to a quality metric based on the quality of one or more of User-A's outgoing communication streams, such as outgoing audio, outgoing video, outgoing shared content, and the like.

Figure 4H:
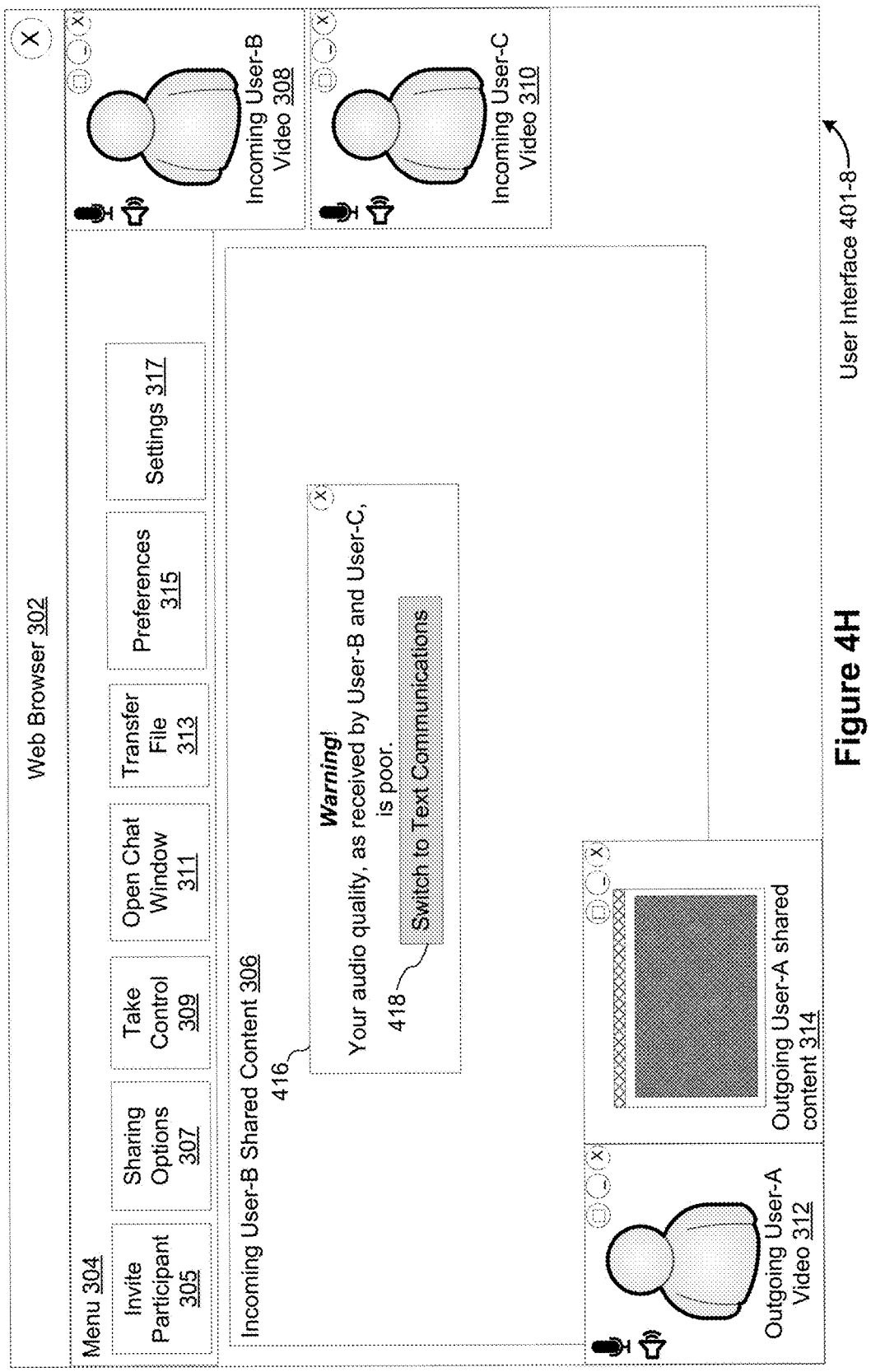

FIG. 4H shows user interface 401-8. User interface 401-8 is the same as user interface 301-1, described above, except that user interface 401-5 further includes warning 416. Warning 416 indicates that User-A's audio, as received by Users B and C, is poor (e.g., high latency, missing or corrupted data, etc.). In some implementations, User-A's client device determines whether the audio quality is poor based on feedback received from Users B and C. In some implementations, User-A's client device determines whether the audio quality is poor by comparing it to the audio quality for other participants. In some implementations, User-A's client device determines whether the audio quality is poor by comparing it one or more user preferences and/or settings. FIG. 4H further shows warning 416 including a text communications affordance 418 for enabling User-A to communicate with Users B and C via text.

Figure 4I:
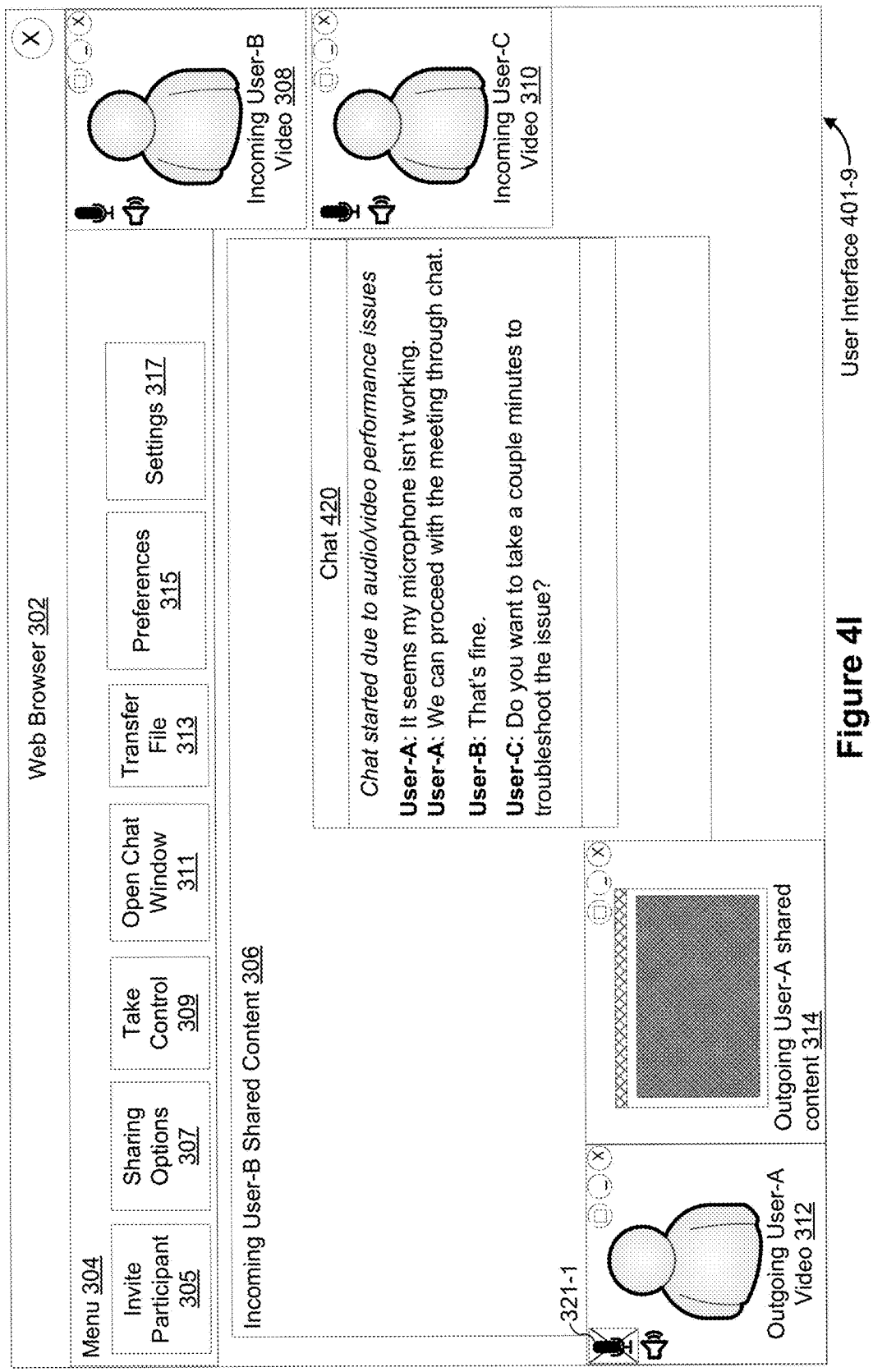

FIG. 4I shows user interface 401-9. User interface 401-9 is the same as user interface 301-1, described above, except that user interface 401-9 further includes chat box 420 and shows microphone icon 321-1 as being disabled. Chat box 420 enables text communications between Users A, B, and C. In some implementations, chat box 420 includes a message indicating that chat box 420 is being displayed in response to audio and/or video performance issues. In some implementations, chat box 420 is shown in response to User-A selecting the text communications affordance 418 show in FIG. 4H. In some implementations, chat box 420 is displayed automatically in accordance with a determination that audio and/or video problems exist. In some implementations, chat box 420 is displayed in response to receiving feedback from User-B and/or User-C, the feedback indicating that User-A's outgoing audio/video is poor. In some implementations, chat box 420 is displayed in response to receiving poor quality audio/video from User-B and/or User-C. FIG. 4I shows microphone icon 321-1 as being disabled. In some implementations, disabled microphone icon 321-1 indicates that User-A has disabled the microphone on User-A's client device. In some implementations, disabled microphone icon 321-1 indicates that User-A has disabled the microphone on User-A's client device. In some implementations, disabled microphone icon 321-1 indicates that User-A's audio, as received by one or more other participants (e.g., User-B), is of poor quality.

Figure 5A:
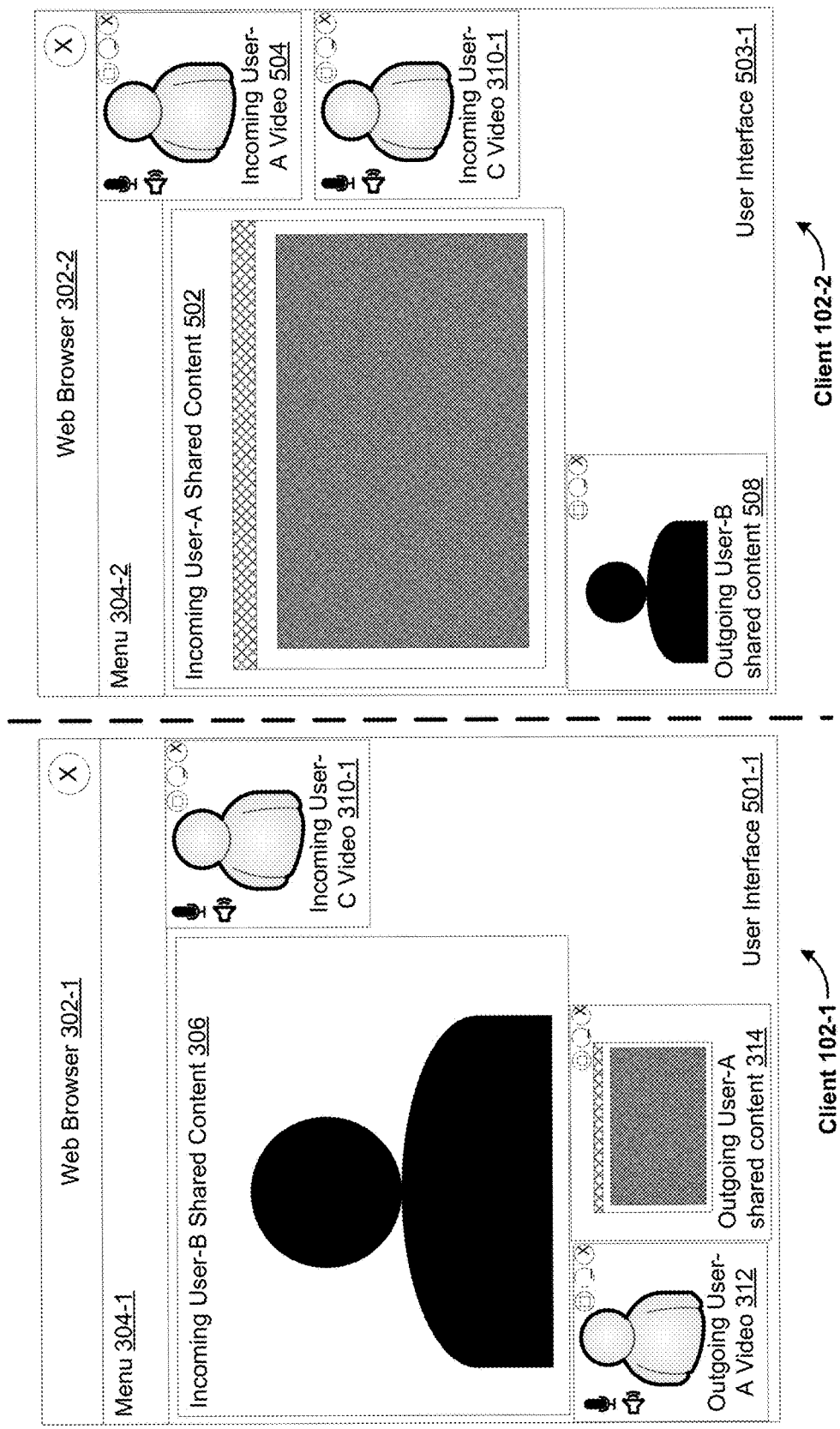
FIGS. 5A-5B illustrate exemplary user interfaces from dual perspectives for participants in an electronic communications in accordance with some implementations.
Figure 5B:
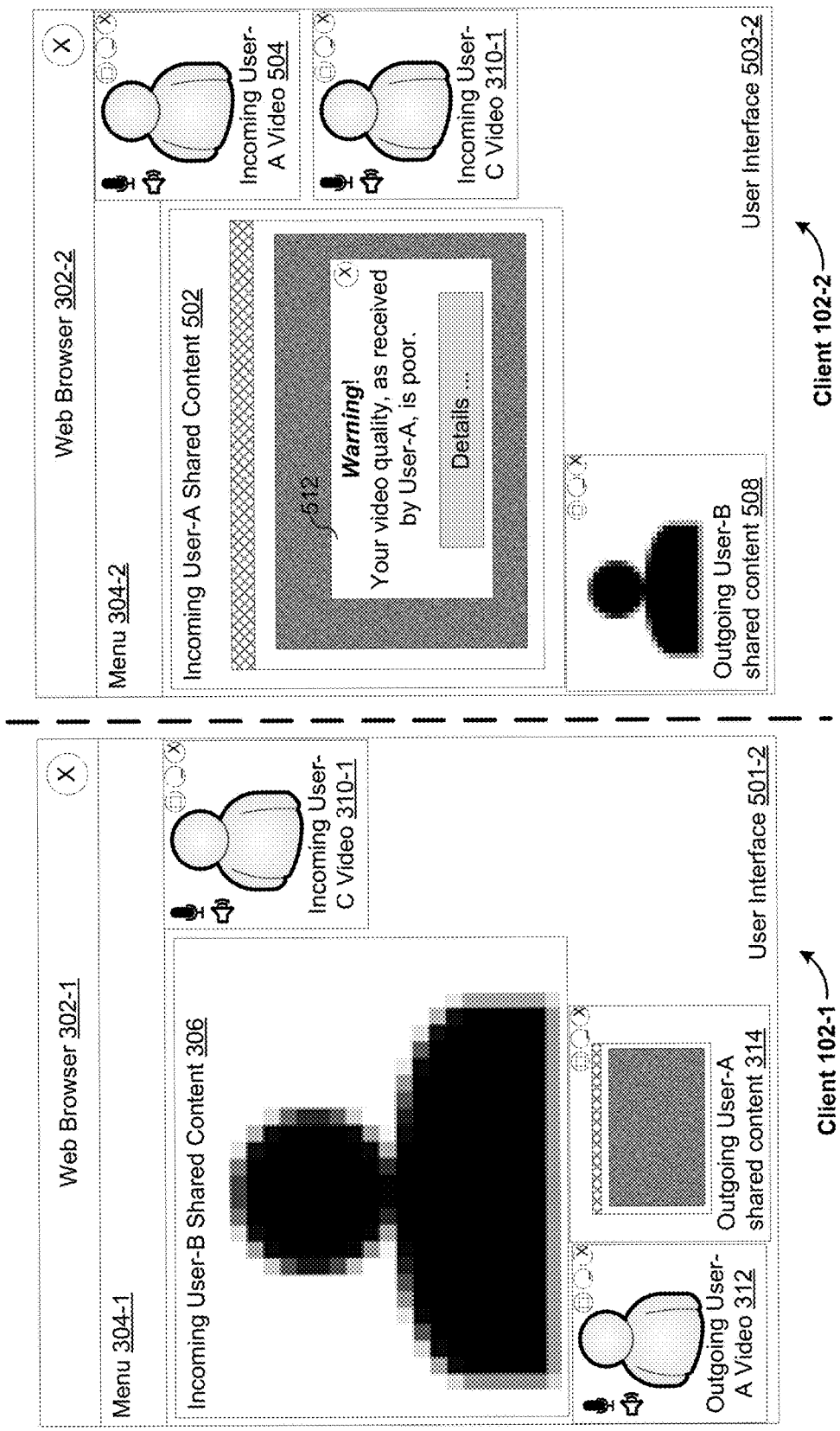

FIGS. 5A-5B illustrate exemplary user interfaces from dual perspectives for participants in an electronic communications in accordance with some implementations. FIG. 5A shows client 102-1 displaying user interface 501-1. User interface 501-1 includes display of incoming User-B shared content 306, incoming User-C video 310-1, outgoing User-A video 312, and outgoing User-A shared content 314. FIG. 5B further shows client 102-2 displaying user interface 503-1. User interface 503-1 includes display of incoming User-A shared content 502, incoming User-A video 504, incoming User-C video 310-1, and outgoing User-B shared content 508. Outgoing User-A video 312 at client 102-1 corresponds to incoming User-A video 504 at client 102-2; and outgoing User-A shared content 314 at client 102-1 corresponds to incoming User-A shared content 502 at client 102-2. Likewise, outgoing User-B shared content 508 at client 102-2 corresponds to incoming User-B shared content 306 at client 102-1.

FIG. 5B shows client 102-1 displaying user interface 501-2 and client 102-2 displaying user interface 503-2. User interface 501-2 is the same as user interface 501-1 (FIG. 5A) except that user interface 501-2 indicates that the incoming User-B shared content 306 is of poor quality (e.g., pixelated). Correspondingly, user interface 503-2 indicates that outgoing User-B shared content 508, as displayed by client 102-1, is poor by artificially pixelating display of the outgoing User-B shared content 508. In accordance with some implementations, user interface 503-2 further indicates that User-B's outgoing content is of poor quality by displaying warning 512.

Figure 6A:
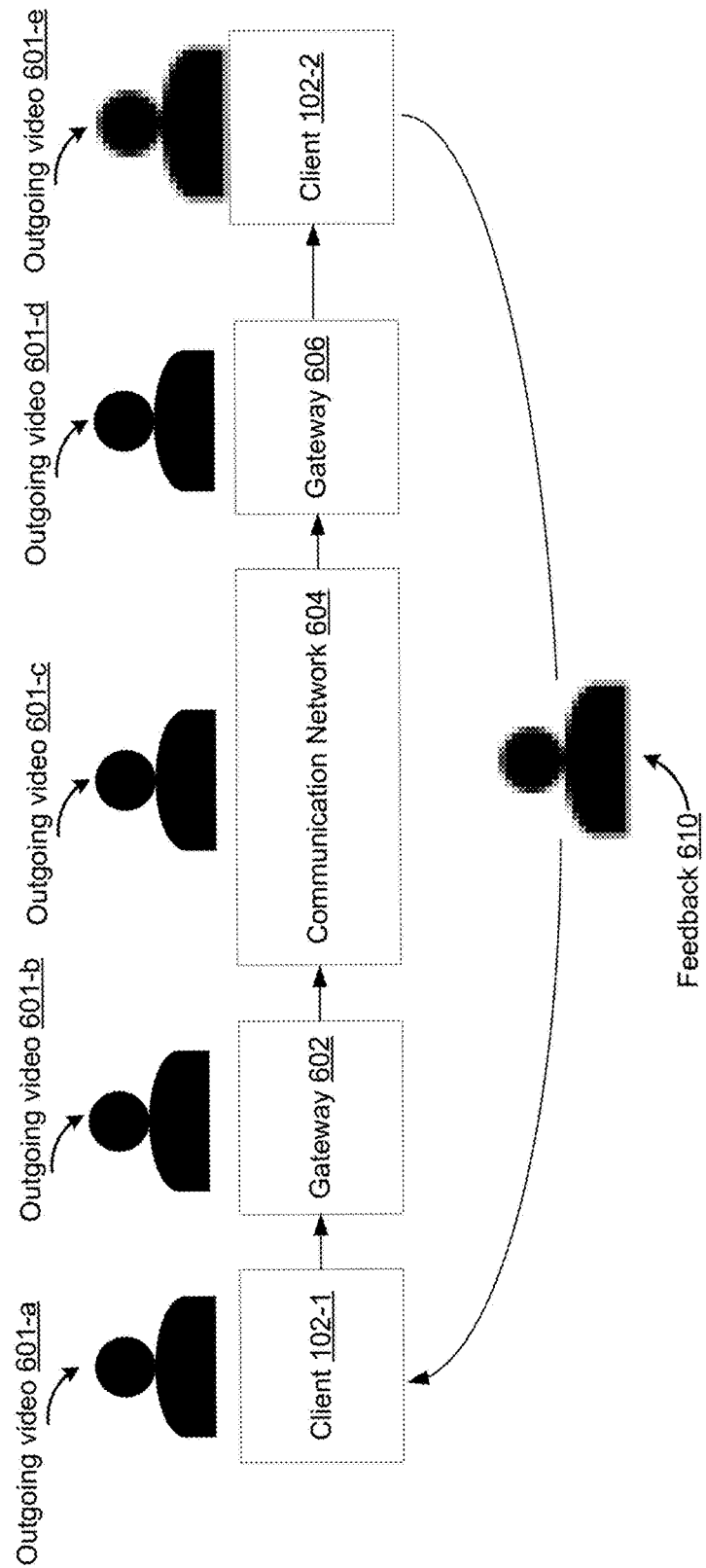
FIGS. 6A-6B are block diagrams illustrating data flows and feedback through exemplary conference architecture in accordance with some implementations.
Figure 6B:
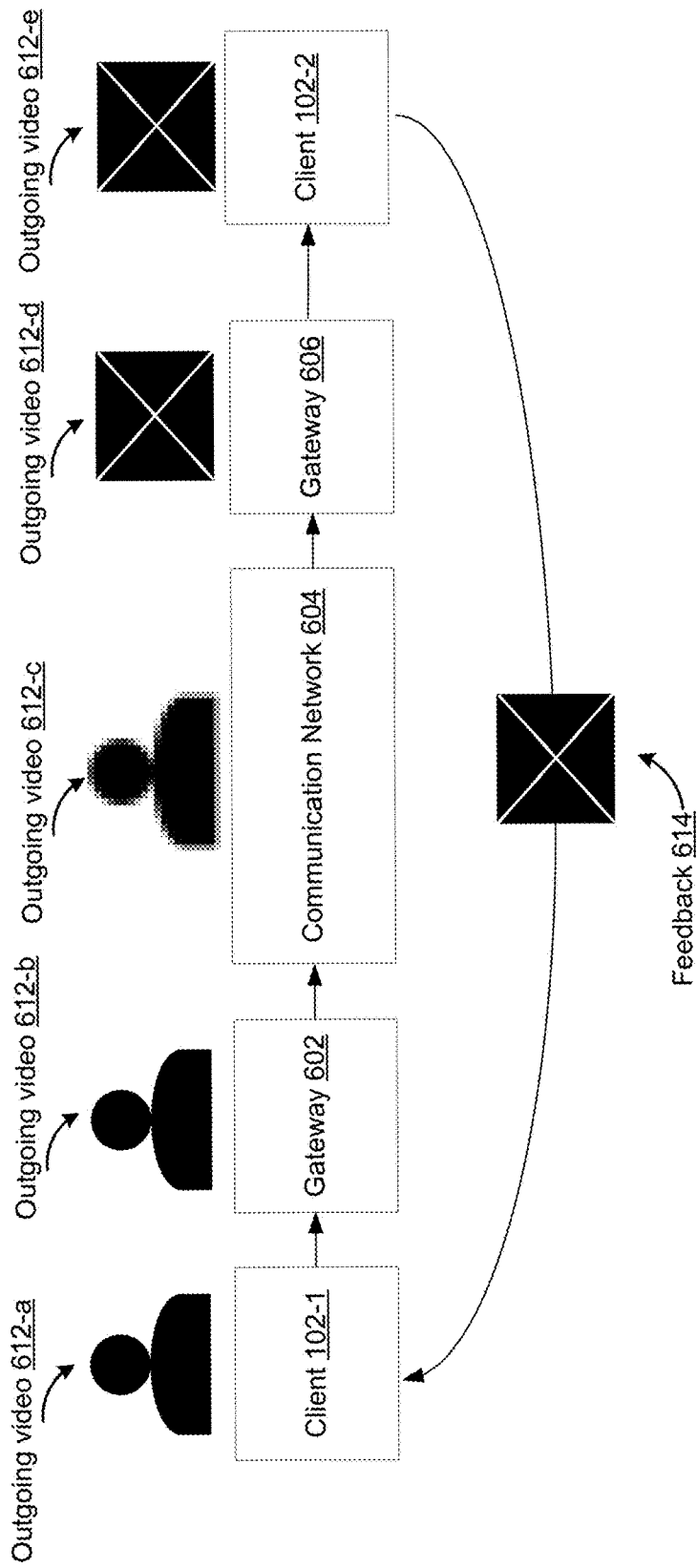

FIGS. 6A-6B are block diagrams illustrating data flows and feedback through exemplary conference architecture in accordance with some implementations. FIG. 6A shows client 102-1 coupled to client 102-2 via gateways 602 and 606 as well as communication network 604. FIG. 6A further shows a quality indicator of outgoing video 601 at each location. Specifically, FIG. 6A shows outgoing video 601-a as generated by client device 102-1, outgoing video 601-b as output by gateway 602, outgoing video 601-c as output by communication network 604, outgoing video 601-d as output by gateway 606, and outgoing video 601-e as displayed by client 102-2. FIG. 6A further shows outgoing video 601-e having degraded quality (e.g., pixelated) as compared to outgoing video 601-a. FIG. 6A further shows client 102-2 generating feedback 610 based on outgoing video 601-e and sending feedback 610 to client 102-1. In some implementations, feedback 610 is sent via gateways 602 and 606 and communication network 604.

Similarly, FIG. 6B shows client 102-1 coupled to client 102-2 via gateways 602 and 606 as well as communication network 604. FIG. 6B further shows a quality indicator of outgoing video 612 at each location. Specifically, FIG. 6B shows outgoing video 612-a as generated by client device 102-1, outgoing video 612-b as output by gateway 602, outgoing video 612-c as output by communication network 604, outgoing video 612-d as output by gateway 606, and outgoing video 612-e as displayed by client 102-2. FIG. 6B further shows outgoing video 612-c having degraded quality (e.g., pixelated) as compared to outgoing video 601-a; and outgoing video 612-d being unavailable (e.g., due to a firewall on gateway 606). FIG. 6B further shows client 102-2 generating feedback 614 based on outgoing video 612-e and sending feedback 614 to client 102-1. For example, feedback 614 indicates that the outgoing video is unable to be displayed at client device 102-2.

Representative Processes

Figure 7A:
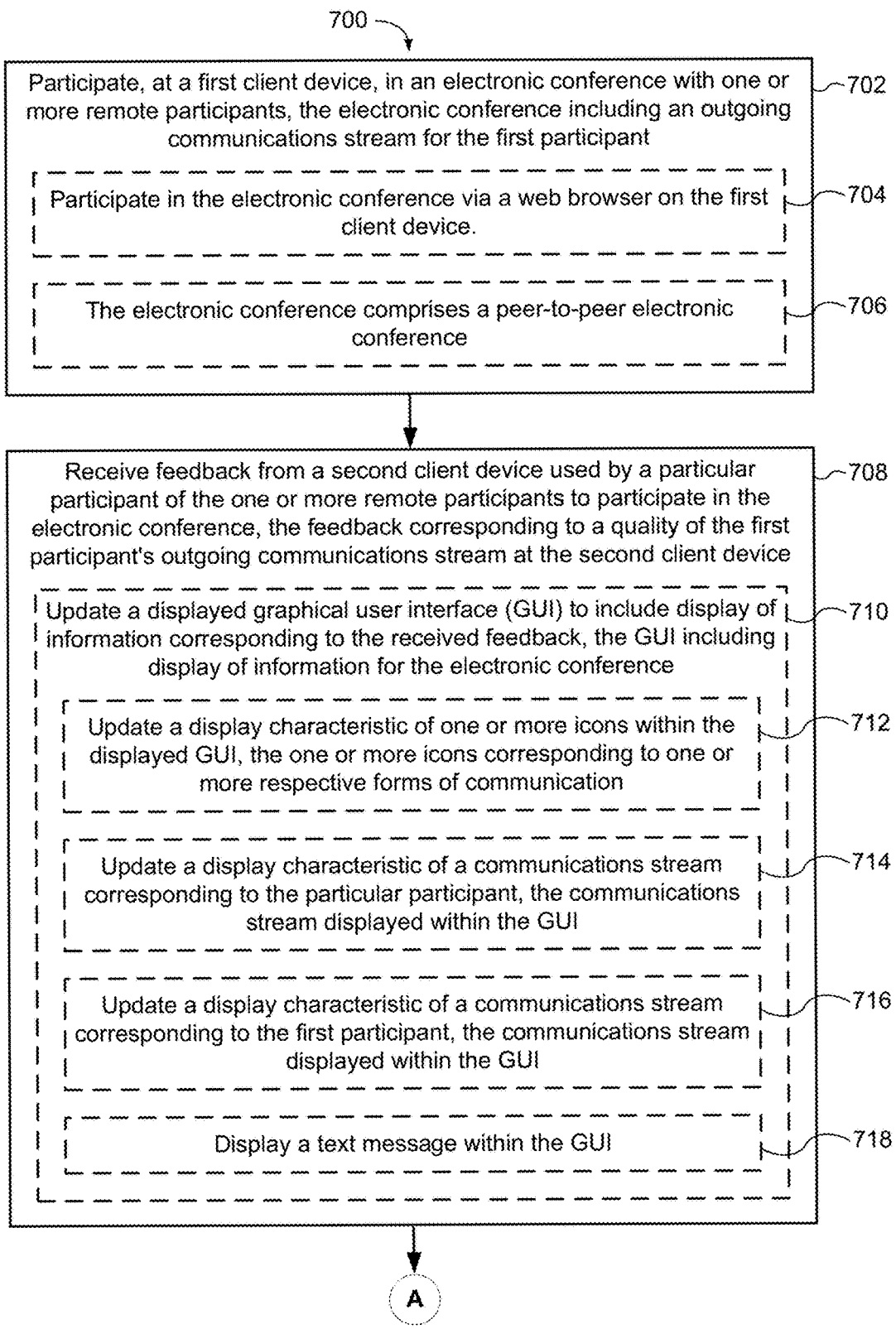
FIGS. 7A-7B illustrate a flowchart representation of a method of providing conferencing feedback to a particular participant, in accordance with some implementations.
Figure 7B:
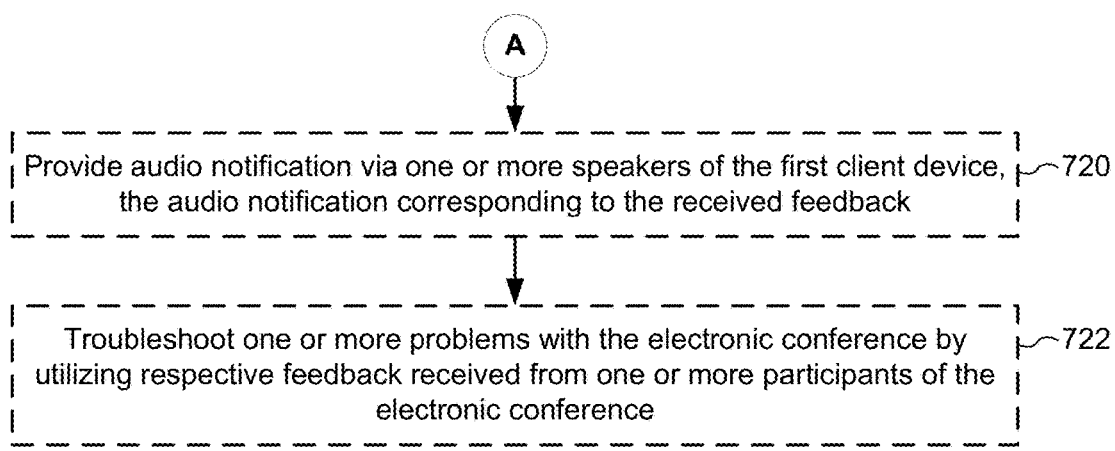
Figure 8A:
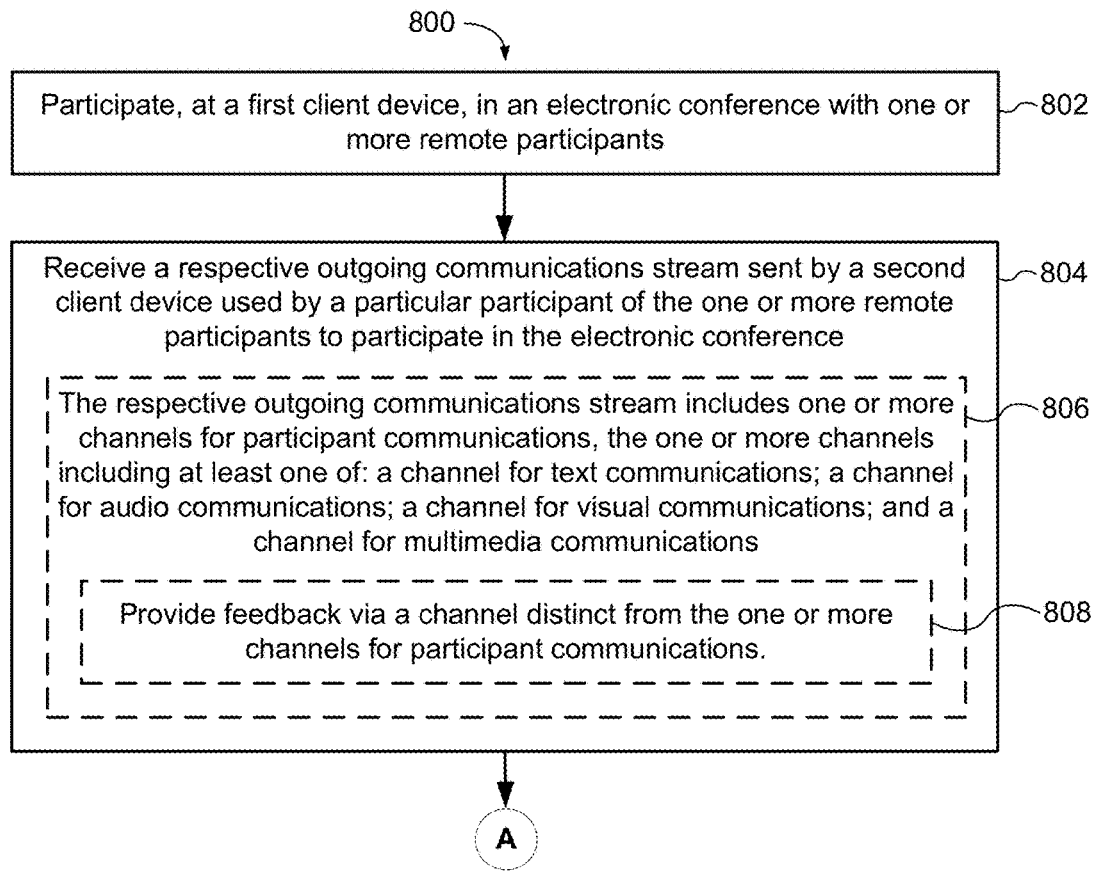
FIGS. 8A-8C illustrate a flowchart representation of a method of providing conferencing feedback from a particular participant, in accordance with some implementations.
Figure 8B:
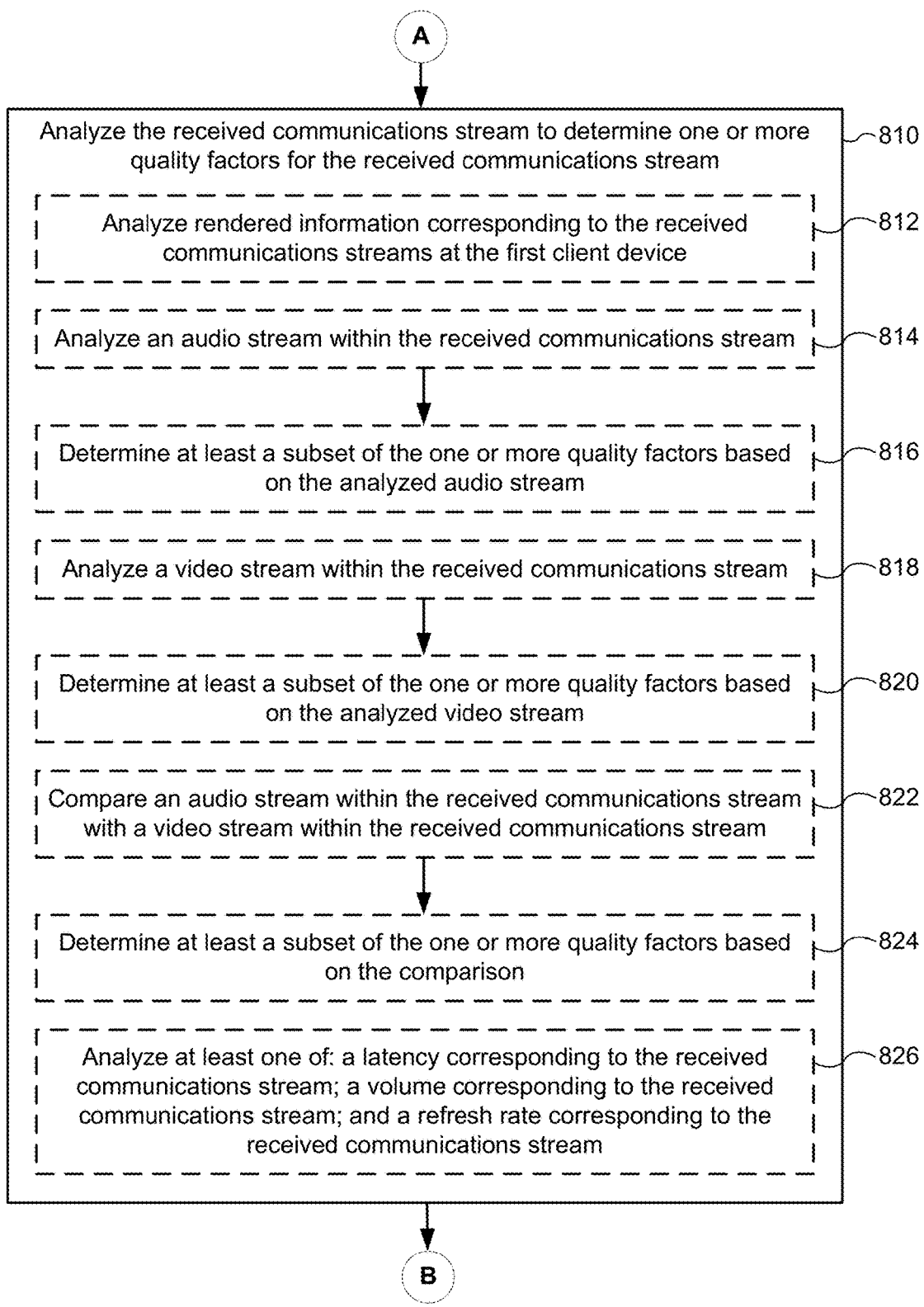
Figure 8C:
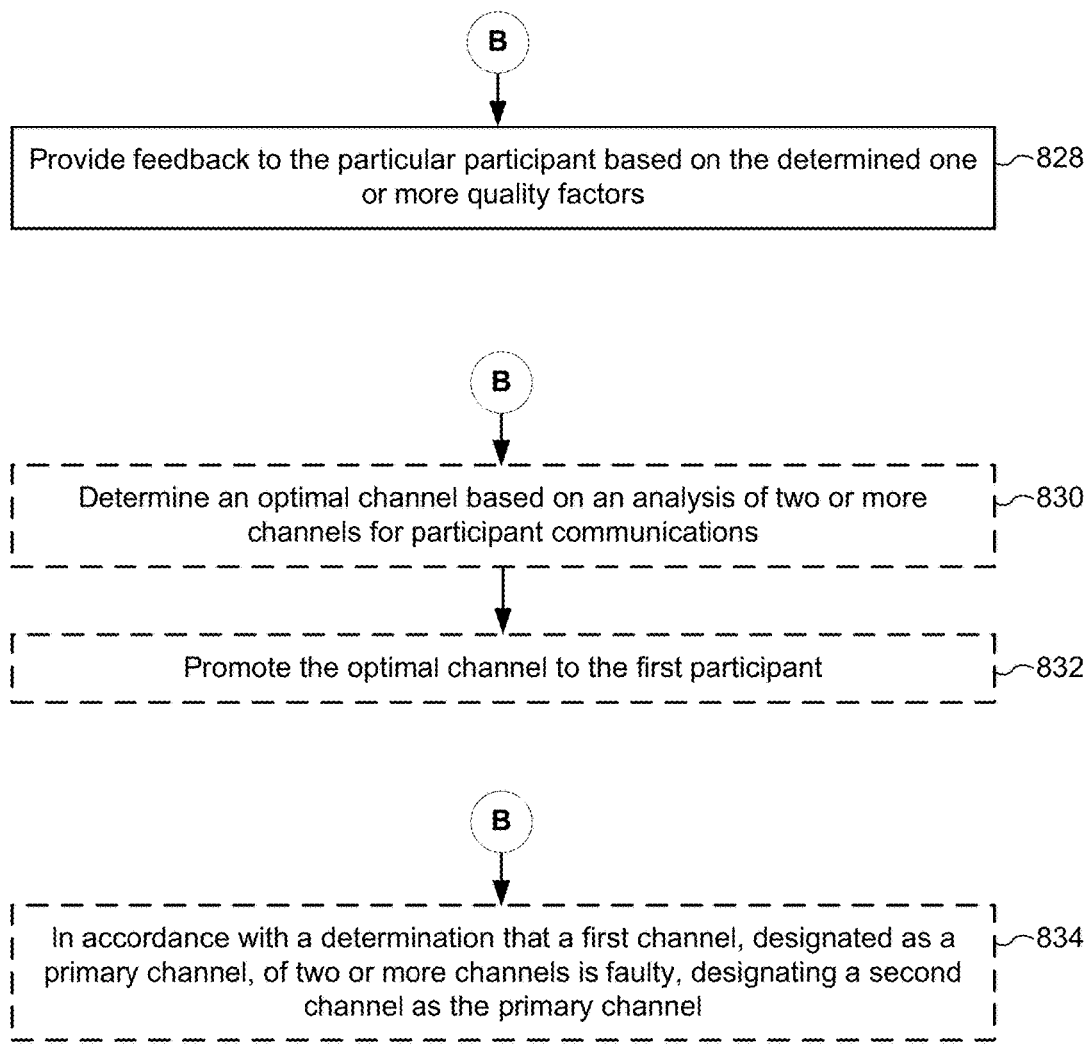
Figure 9:
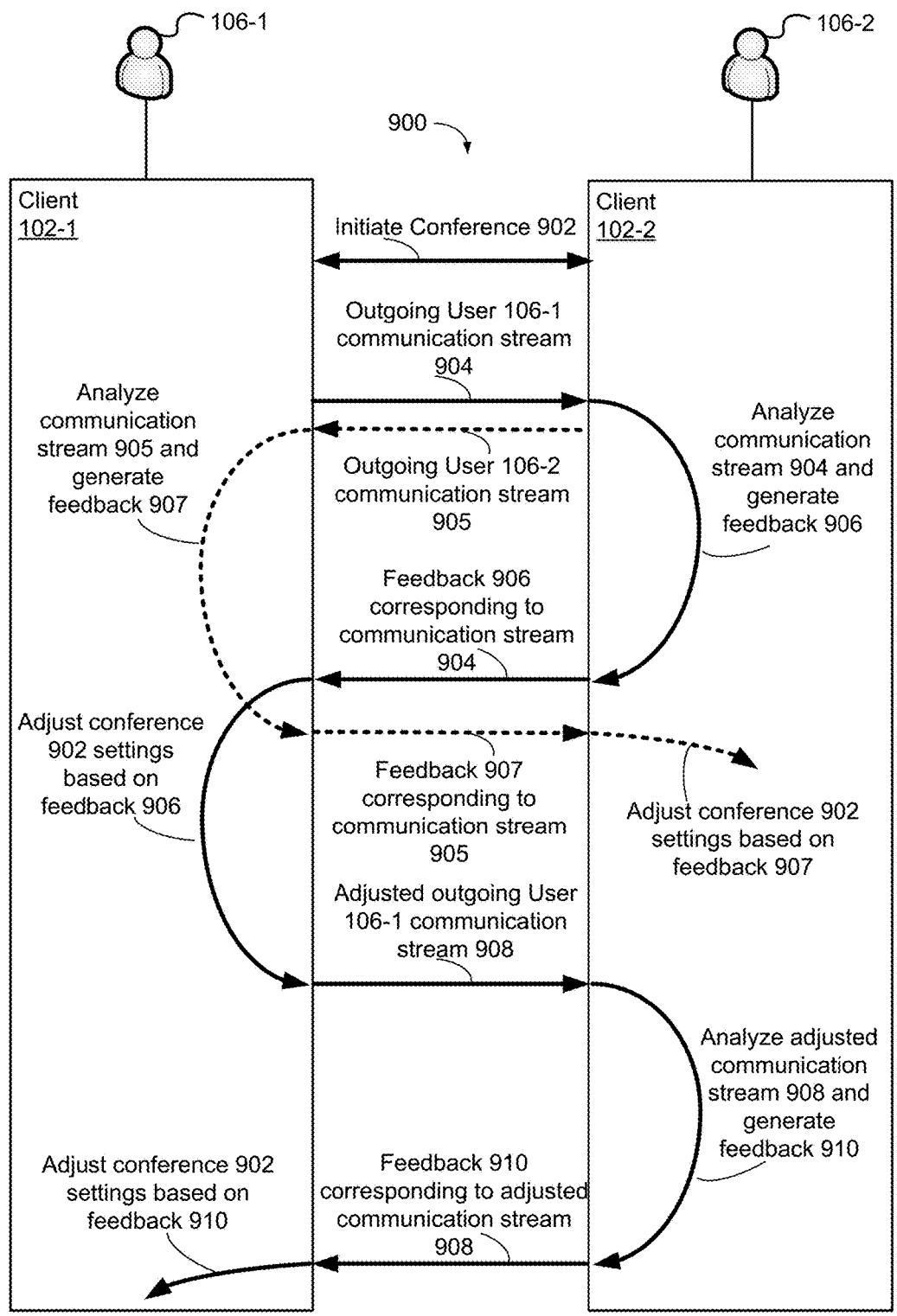
FIG. 9 illustrates communication flows between two participants in an exemplary electronic conference, in accordance with some implementations.

Attention is now directed to the flowchart representations of FIGS. 7A-7B, FIGS. 8A-8C, and FIG. 9. FIGS. 7A-7B illustrate a flowchart representation of a method of providing conferencing feedback to a particular participant, in accordance with some implementations. FIGS. 8A-8C illustrate a flowchart representation of a method of providing conferencing feedback from a particular participant, in accordance with some implementations. FIG. 9 illustrates communication flows between two participants in an exemplary electronic conference, in accordance with some implementations.

In some implementations, the methods 700 and 800 are performed by: (1) one or more client devices, such as the client devices 102 in FIG. 1; (2) one or more server systems;

or (3) a combination thereof. Thus, in some implementations, the operations of the methods 700 and 800 described herein are entirely interchangeable, and respective operations of the methods 700 and 800 are performed by any of the aforementioned devices, systems, or combination of devices and/or systems. In some embodiments, methods 700 and 800 are governed by instructions that are stored in a non-transitory computer readable storage medium and that are executed by one or more processors of a device/computing system, such as the one or more CPU(s) 202 of a client device 102 (FIG. 2) and/or the one or more CPU(s) of a server system.

Referring now to FIGS. 7A-7B. A first participant participates (702), at a first client device, in an electronic conference with one or more remote participants, the electronic conference including an outgoing communications stream for the first participant. For example, FIG. 1 shows user 106-1 participating in electronic conference 100 with users 106-2 through 106-r. In accordance with some implementations, FIG. 3A shows a displayed video stream for each participant, specifically outgoing User-A video 312, incoming User-B video 308, and incoming User-C video 310-a. In some implementations, the outgoing communications stream includes an audio communications stream, a video communications stream, a text communications stream, and/or an audiovisual communications stream. In some implementations, the first client device enables the first participant to participate in the electronic conference. For example, the first participant participates in the electronic conference by utilizing communication interface(s) 204 in conjunction with communication module 218 in FIG. 2.

In some implementations, the first participant participates (704) in the electronic conference via a web browser on the first client device (e.g., web browser 104, FIG. 2). For example, FIG. 3A shows User-A participating in an electronic conference via web browser 302. In some implementations, the first participant participates in the electronic conference via a mobile application. In some implementations, the electronic conference is conducted via a programming language such as JavaScript. In some implementations, the web browser may be refreshed without the participant losing connection to the electronic conference.

In some implementations, the electronic conference comprises (706) a peer-to-peer electronic conference. For example, the electronic conference is not hosted on a separate server such as a cloud server. In some implementations, the electronic conference is hosted by a particular participant in the electronic conference. In some implementations, a particular participant is denoted as the conference host. In some implementations, the conference host changes during the conference. In some implementations, the conference host is determined based on a comparison of the feedback corresponding to each participant.

The first client device receives (708) feedback from a second client device used by a particular participant of the one or more remote participants to participate in the electronic conference, the feedback corresponding to a quality of the first participant's outgoing communications stream at the second client device. In some implementations, the feedback includes one or more numerical quality factors. In some implementations, the feedback includes one or more qualitative quality labels. For example, the first client device receives the feedback by utilizing communication interface(s) 204 in conjunction with communication module 218 and/or feedback module 228 in FIG. 2.

In some implementations, the first client device updates (710) a displayed graphical user interface (GUI) to include display of information corresponding to the received feedback, the GUI including display of information for the electronic conference. For example, FIG. 4F shows user interface 401-6 including overlay 410, where overlay 410 is based on feedback received from other users (e.g., User-B). For example, in response to receiving feedback indicating that a participant's audio quality is poor, a border corresponding to the participant's outgoing data changes color (e.g., turns orange or red). In some implementations, one or more display characteristics of the emphasized content are updated. For example, the border of the emphasized content changes color to indicate an issue identified via the received feedback. In some implementations, the display of information corresponding to the received feedback is determined based on one or more user preferences and/or one or more conference settings (e.g., one or more user preferences stored in client data 232, FIG. 2). For example, a particular participant sets a user preference that received feedback be displayed with display of outgoing content rather than display of incoming content. As another example, a particular participant sets a user preference that the received feedback be displayed with the content currently being emphasized. In some implementations, the displayed feedback information includes simple state information (e.g., a particular communications stream is faulty or not). In some implementations, the displayed feedback information indicates the quality of communications (e.g., a green icon for good quality, a yellow icon for medium quality, and a red icon for poor quality). In some implementations, the displayed feedback information includes one or more indicators for one or more qualitative labels. In some implementations, the displayed feedback information includes one or more indicators for one or more numerical quality factors. For example, the first client device displays the GUI by utilizing display 208 in conjunction with display module 222 in FIG. 2.

In some implementations, the first client device updates (712) a display characteristic of one or more icons within the displayed GUI (e.g., icon color), the one or more icons corresponding to one or more respective forms of communication (e.g., audio, video, text). For example, FIG. 4I shows user interface 401-9 including displaying microphone icon 321-1 as disabled. In some implementations, the first client device aggregates feedback from multiple participants and updates display characteristic(s) based on the aggregated feedback. For example, in response to receiving feedback indicating that a participant's audio quality is poor, a microphone icon changes color (e.g., turns red) or a speaker icon is grayed out. In some implementations, the one or more icons are shown with the participant's outgoing content. In some implementations, the one or more icons are shown with the emphasized content. For example, in FIG. 3A the emphasized content is displayed incoming User-B shared content 306, while in FIG. 3D the emphasized content is displayed outgoing User-A shared content 314. In some implementations, the one or more icons are designated for displaying received feedback. In some implementations, the one or more icons are customizable by a particular participant. In some implementations, the display characteristics of the one or more icons are based on one or more user preferences and/or one or more conference settings (e.g., one or more user preferences stored in client data 232, FIG. 2). For example, a particular participant can set user preferences denoting a preferred location for each of the one or more icons within the user interface. For example, the first client device updates the display by utilizing display module 222 and/or feedback module 228 in FIG. 2.

In some implementations, the first client device updates (714) a display characteristic of a communications stream corresponding to the particular participant, the communications stream displayed within the GUI. For example, introducing artificial static to the communications stream, adding interference lines, lowering the frame rate, and the like. In accordance with some implementations, FIG. 4F shows incoming User-B shared content 306 displayed with overlay 410 corresponding to feedback received from User-B's client device. In some implementations, the communications stream comprises a video stream. In some implementations, the communications stream comprises shared electronic content, such as a shared desktop or window(s). In some implementations, the first client device aggregates feedback from multiple participants and updates display characteristic(s) based on the aggregated feedback. For example, the first client device updates the display by utilizing display module 222 and/or feedback module 228 in FIG. 2.

In some implementations, the first client device updates (716) a display characteristic of a communications stream corresponding to the first participant, the communications stream displayed within the GUI. For example, introducing artificial static to the video stream, adding interference lines, lowering the frame rate, and the like. In accordance with some implementations, FIG. 4D shows outgoing User-A video 312 displayed with overlay 402 corresponding to feedback received from User-B's client device. In some implementations, the communications stream comprises a video stream. In some implementations, the communications stream comprises shared electronic content, such as a shared desktop or window(s). In some implementations, the first client device aggregates feedback from multiple participants and updates display characteristic(s) based on the aggregated feedback. For example, the first client device updates the display by utilizing display module 222 and/or feedback module 228 in FIG. 2.

In some implementations, the first client device displays (718) a text message within the GUI. For example, FIG. 4E shows warning 404 displayed in response to feedback received from User-C. In some implementations, the text message appears in a new window. In some implementations, the text message appears in an existing window, such as a chat window. In some implementations, the text message appears as an overlay (e.g., as an overlay of displayed outgoing User-A video 312).

In some implementations, the first client device provides (720) audio notification via one or more speakers of the first client device, the audio notification corresponding to the received feedback. In some implementations, the audio notification includes at least one of: artificial static, beeps, words, and the like. In some implementations, the audio notification includes modifying the audio communications such as modulating an audio signal. In some implementations, the first client device aggregates feedback from multiple participants and modulates the audio signal based on the aggregated feedback. For example, the first client device provides audio notification by utilizing I/O interface 206 in conjunction with feedback module 228 in FIG. 2.

In some implementations, the first client device troubleshoots (722) one or more problems with the electronic conference by utilizing respective feedback received from one or more participants of the electronic conference. In some implementations, troubleshooting includes checking the first participant's video quality as received by other participants. In some implementations, troubleshooting includes performing one or more diagnostic tests, such as pinging one or more other participants, checking firewall settings, checking camera settings, analyzing the first participant's outgoing video quality at first client device, and the like. For example, the first client device troubleshoots the one or more problems by utilizing communication interface(s) 204 in conjunction with communications processing module 220 in FIG. 2.

It should be understood that the particular order in which the operations in FIGS. 7A-7B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the method 700 described above with respect to FIGS. 7A-7B.

Referring now to FIGS. 8A-8C. A first participant participates (802), at a first client device, in an electronic conference with one or more remote participants. For example, FIG. 1 shows user 106-1 participating in electronic conference 100 with users 106-2 through **106-*r*. In some implementations, the electronic conference comprises a teleconference. In some implementations, the first client device comprises a mobile device, such as a cell phone or tablet. For example, the first participant participates in the electronic conference by utilizing communication interface(s) 204 in conjunction with communication module 218 in FIG. 2**.

The first client device receives (804) a respective outgoing communications stream sent by a second client device used by a particular participant of the one or more remote participants to participate in the electronic conference. For example, FIG. 6A shows client 102-2 receiving outgoing video 601 from client 102-1. For example, the first client device receives the communications stream by utilizing communication interface(s) 204 in conjunction with communication module 218 in FIG. 2.

In some implementations, the respective outgoing communications stream includes (806) one or more channels for participant communications, the one or more channels including at least one of: a channel for text communications; a channel for audio communications; a channel for visual communications; and a channel for multimedia communications. In accordance with some implementations, FIG. 4I shows displayed chat 420 corresponding to a text communications channel and incoming User-B video 308 corresponding to a multimedia communications channel. In some implementations, a particular participant's audio data is transmitted via a distinct channel from the particular participant's video data. In some implementations, the audio-visual information is transmitted via a single channel. In some implementations, each channel utilizes a distinct application port. In some implementations, a first channel utilizes a first web socket and a second channel utilizes a second web socket, distinct from the first web socket.

In some implementations, the first client device provides (808) feedback via a channel distinct from the one or more channels for participant communications. In some implementations, the feedback is transmitted via a channel used to establish the teleconference. In some implementations, the feedback is transmitted via the channel determined to be most reliable. In some implementations, the feedback is transmitted via the channel determined to be the lowest bandwidth. For example, the first client device provide feedback by utilizing communication interface(s) 204 in conjunction with feedback module 228 in FIG. 2.

The first client device analyzes (810) the received communications stream to determine one or more quality factors for the received communications stream. For example, FIG. 6A shows client 102-2 receiving outgoing video 601-*e* and generating feedback 610 based on an analysis of the received video. In some implementations, the one or more quality factors are numerical factors. In some implementations, the one or more quality factors are quantitative quality factors. In some implementations, the one or more quality factors include distinct quality factor(s) for each mode of communication (e.g., text, audio, visual, etc.). In some implementations, the one or more quality factors include distinct quality factor(s) for each communication channel. In some implementations, the first client device utilizes the one or more quality factors to rank each communications stream in terms of quality and/or stability. In some implementations, the analysis is conducted utilizing a programming language, such as JavaScript, built into a web browser. In some implementations, the analysis includes performing speech-to-text on received audio data. In some implementations, the analysis includes performing optical character recognition (OCR) on the received video data. For example, the first client device analyzes the received communications stream by utilizing communication interface(s) 204 in conjunction with communications processing module 220 in FIG. 2.

In some implementations, loudness, sharpness, boom, roughness, fluctuation strength, tonality, overall level, time averaged level, and sound exposure level are optionally analyzed to generate corresponding quality factors. In some implementations, blockiness, blur, color bleed, flickering, jitter, and other video irregularities are optionally analyzed to generate corresponding quality factors. In some implementations, the first client device generates one or more qualitative quality labels based on the one or more quality factors. It would be apparent to one skilled in the art that the above quality factors can be computed using a variety of well-known algorithms. For example, the University of Salford has published formulae for computing a number of sound quality metrics, including the ones listed above (see http://www.salford.ac.uk/computing-science-engineering/research/acoustics/psychoacoustics/sound-quality-making-products-sound-better/sound-quality-testing/sound-quality-metrics, Sep. 17, 2015). Similarly, formulae for computing video quality factors are described in Mylène C. Q. Farias (2010). *Video Quality Metrics, Digital Video*, Floriano De Rango (Ed.), ISBN: 978-953-7619-70-1, InTech, DOI: 10.5772/8038. Available from: http://www.intechopen.com/books/digital-video/video-quality-metrics In some implementations, an electronic device, distinct from the first client device, analyzes the received communications stream to determine one or more quality factors. In some implementations, the one or more quality factors determined by the electronic device are aggregated with the one or more quality factors determined by the first client device. For example, the electronic device determines one or more quality factors relating to network performance and the first client device determines one or more quality factors relating to rendering and/or interpretation of the communications stream. In some implementations, the electronic device comprises a server, such as a cloud server.

In some implementations, the first client device analyzes (812) rendered information corresponding to the received communications streams at the first client device. In accordance with some implementations, the outgoing video 601-*e* in FIG. 6A represents the state of the outgoing video after being rendered at client 102-2 and the feedback 610 is generated based on the outgoing video 601-*e*. Rendering the received communications stream prior to generating feedback enables the client device to account for any issues that may have arisen during rendering. For example, the first client device analyzes the rendered information by utilizing display 208 in conjunction with display module 222 and/or communications processing module 220 in FIG. 2.

In some implementations, the first client device analyzes (814) an audio stream within the received communications stream; and determines (816) at least a subset of the one or more quality factors based on the analyzed audio stream. For example, analyzing via voice activity detection, voice analysis, and/or speech recognition. In some implementations, analyzing the audio stream includes live calculations of sharpness, roughness, fluctuation strength, and the like. In some implementations, analyzing audio communications within the received communications stream comprises analyzing the audio communications via a microphone at the first client device. In some implementations, the respective outgoing communications stream includes an audio watermark and analyzing the audio communications includes determining whether the audio watermark is present. In some implementations, analyzing the audio stream includes performing voice activity detection on the audio stream. For example, an analysis service running in a web browser detects sound activity of any kind. In some implementations, analyzing the audio stream includes performing a voice analysis on the audio stream. For example, an analysis service running in a web browser detects the existence and quality of the audio (e.g., using a variety of known methods). In some implementations, analyzing the audio stream includes performing speech recognition on the audio stream. In some implementations, analyzing the audio stream includes analyzing the audio data after it is output from the first participant's speakers. In some implementations, the audio stream includes audio data from the particular participant's microphone. For example, the first client device analyzes the audio stream by utilizing communication interface(s) 204 in conjunction with communications processing module 220 in FIG. 2.

In some implementations, the first client device analyzes (818) a video stream within the received communications stream; and determines (820) at least a subset of the one or more quality factors based on the analyzed video stream. For example, analyzing via pixel detection (such as detecting non-black pixels), pixel distributions, and the like. In some implementations, analyzing the video stream includes detecting blockiness, blur, color bleed, flickering, jitter, and the like. In some implementations, analyzing the video stream includes detecting pixel activity within the video data of the video stream. For example, an analysis service running in the web browser detects pixel activity of any kind. In some implementations, an analysis service running in the web browser determines the quality of the video data by utilizing a variety of known methods. For example, the first client device analyzes the video stream by utilizing communication interface(s) 204 in conjunction with communications processing module 220 in FIG. 2.

In some implementations, the first client device compares (822) an audio stream within the received communications stream with a video stream within the received communications stream; and determines (824) at least a subset of the one or more quality factors based on the comparison. For example, comparing the audio and video streams optionally includes comparing pixel changes within the video with the audio, performing OCR on the video and comparing with audio, and the like. In some implementations, comparing the audio and video streams includes comparing factors corresponding to the audio quality with factors corresponding to the video quality. For example, the first client device compares the audio stream with the video stream by communications processing module 220 in FIG. 2.

In some implementations, the first client device analyzes (826) at least one of: a latency corresponding to the received communications stream; a volume corresponding to the received communications stream; and a refresh rate corresponding to the received communications stream. In some implementations, the first client device analyzes frame rates, pixelation, blur, and the like.

The first client device provides (828) feedback to the particular participant based on the determined one or more quality factors. In some implementations, the first client device generates the feedback. In some implementations, the feedback is transmitted via the received communications stream. In some implementations, the feedback is transmitted via a channel used to establish the teleconference. In some implementations, the feedback is transmitted via the channel determined to be most stable. In some implementations, the feedback is transmitted via the channel determined to currently have the largest available bandwidth. In some implementations, the feedback is transmitted via a third party service. For example, the first client device provides feedback by utilizing communication interface(s) 204 in conjunction with feedback module 228 in FIG. 2.

In some implementations, the first client device determines (830) an optimal channel based on an analysis of two or more channels for participant communications; and promotes (832) the optimal channel to the first participant. In some implementations, promoting the optimal channel includes automatically switching to the optimal channel. For example, the electronic conference is as shown in FIG. 3A. In this example, the first client device determines that a text communications channel is the optimal channel and automatically opens the chat 420 as shown in FIG. 4I. In some implementations, promoting the optimal channel includes suggesting to the first participant that the first participant switch to the optimal channel. For example, the electronic conference is as shown in FIG. 3A. In this example, the first client device determines that a text communications channel is the optimal channel and promotes it via warning 416 as shown in FIG. 4H. For example, the first client device determines an optimal channel by utilizing communications processing module 220 and/or communication module 218 in FIG. 2.

In some implementations, in accordance with a determination that a first channel, designated as a primary channel, of two or more channels is faulty, the first client device designates (834) a second channel as the primary channel. For example, the electronic conference is as shown in FIG. 3A. In this example, the first client device determines that the communications channel corresponding to the incoming User-B shared content 306 is faulty and designates the chat 420, as shown in FIG. 4I, as the primary channel. In some implementations, the faulty channel is demoted below non-faulty channels in a ranking In some implementations, the first channel is determined to be faulty when one or more quality factors associated with the first channel meet one or more predefined criteria. For example, the percentage of non-black pixels in a video stream falls below a predetermined threshold. For example, the first client device determines that the first channel is faulty by utilizing communications processing module 220, feedback module 228, and/or communication module 218 in FIG. 2.

In some implementations, a particular participant (e.g., a participant designated as the host) receives feedback relating to other participants. For example, User-A is designated as the host and receives feedback related to User-B's communications as received by User-C.

In some implementations, a participant designates a secondary electronic device and, in response to a determination that communications via the first client device are poor, the secondary electronic device is utilized. For example, a particular participant joins the electronic conference on a laptop (a first client device). The particular participant receives feedback from another participant's client device that the particular participant's audio is poor (e.g., unintelligible) and the particular participant's cell phone (a secondary electronic device) is connected to the electronic conference. In some implementations, poor communications are communications that are unintelligible. In some implementations, poor communications are communications fall below predetermined quality standards.

It should be understood that the particular order in which the operations in FIGS. 8A-8C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to the method 800 described above with respect to FIGS. 8A-8C.

Referring now to FIG. 9. FIG. 9 shows communication flows 900 between client device 102-1 and client device 102-2, in accordance with some implementations. In FIG. 9, user 106-1 (e.g., User-A) conferences with user 106-2 (e.g., User-B) via client devices 102-1 and 102-2. First the conference is initiated (902). Each client device 102 then sends an outgoing communication stream to the other client device 102.

Thus, client device 102-1 sends outgoing user 106-1 communication stream 904. Client device 102-2 analyzes the communication stream 904 to generate feedback 906 and transmits the feedback 906 to client device 102-1. Client device 102-1 adjusts one or more conference settings based on feedback 906. This process is optionally repeated as the conference continues.

Thus, client device 102-1 then transmits an adjusted outgoing user 106-1 communication stream 908 to client device 102-2. Client device 102-2 analyzes the adjusted communication stream 908 and generates feedback 910. Client device 102-2 transmits the feedback 910 to client device 102-1. Client 102-1 analyses the feedback 910 and adjusts one or more conference settings accordingly.

Similarly, client device 102-2 sends outgoing user 106-2 communication stream 905 to client device 102-1. Client device 102-1 analyzes communication stream 905 and generates feedback 907. Client device 102-1 transmits feedback 907 to client device 102-2. Client device 102-2 adjusts one or more conference settings based on feedback 907. This process is optionally repeated as the conference continues.

It should be understood that the particular order in which the operations in FIG. 9 have been described is merely an example and is not intended to indicate that the described order is the only order in which the operations could be performed. One of ordinary skill in the art would recognize various ways to reorder the operations described herein.

Additionally, it should be noted that details of other processes described herein with respect to other methods and/or processes described herein are also applicable in an analogous manner to the communication flows described above with respect to FIG. 9.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not necessarily the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Also, as used herein, the term "exemplary" means "serving as an example, instance, or illustration." Thus, an exemplary user interface is a user interface serving as an example, though not necessarily the best example or the ideal example.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for providing conferencing feedback to a first participant, the method comprising:
    at a first client device with one or more processors and memory coupled to the one or more processors:
        participating in an electronic conference with one or more remote participants, the electronic conference including an outgoing communications stream for the first participant; and
        receiving feedback from a second client device used by a particular participant of the one or more remote participants, to participate in the electronic conference, the feedback corresponding to a quality of the first participant's outgoing communications stream at the second client device;
    wherein the feedback includes a subset of one or more quality factors determined based on an analysis of audio or video of the first participant's outgoing communications stream at the second client device.

2. The method of claim 1, wherein the first client device further comprises a display; and
    the method further comprises:
        displaying a graphical user interface (GUI) on the display of the first client device, the GUI including display of information for the electronic conference; and
        updating the displayed GUI to include display of information corresponding to the received feedback.

3. The method of claim 2, wherein updating the displayed GUI includes updating a display characteristic of one or more icons within the displayed GUI, the one or more icons corresponding to one or more respective forms of communication.

4. The method of claim 2, wherein the displayed GUI includes a communications stream corresponding to the particular participant; and
    wherein updating the displayed GUI includes updating a display characteristic of the communications stream corresponding to the particular participant.

5. The method of claim 2, wherein the displayed GUI includes a communications stream corresponding to the first participant; and
    wherein updating the displayed GUI includes updating a display characteristic of the communications stream corresponding to the first participant.

6. The method of claim 2, wherein updating the displayed GUI includes displaying a text message within the GUI.

7. The method of claim 1, wherein the first client device further comprises one or more speakers; and the method further comprising providing audio notification via the one or more speakers of the first client device, the audio notification corresponding to the received feedback.

8. The method of claim 1, wherein participating in the electronic conference comprises participating in the electronic conference via a web browser on the first client device.

9. The method of claim 1, wherein the electronic conference comprises a peer-to-peer electronic conference.

10. The method of claim 1, further comprising troubleshooting one or more problems with the electronic conference by utilizing respective feedback received from one or more participants of the electronic conference.

11. A method for providing conferencing feedback from a first participant, the method comprising:
at a first client device with one or more processors and memory coupled to the one or more processors:
participating in an electronic conference with one or more remote participants;
receiving a communications stream sent by a second client device used by a particular participant of the one or more remote participants to participate in the electronic conference;
analyzing the received communications stream to determine one or more quality factors for the received communications stream, including analyzing audio or video within the received communications stream and determining at least a subset of the one or more quality factors based on the analyzed audio or video; and
providing feedback to the particular participant based on the determined at least a subset of the one or more quality factors.

12. The method of claim 11, further comprising rendering information corresponding to the received communications streams at the first client device;
wherein analyzing the received communications stream to determine one or more quality factors for the received communications stream includes analyzing the rendered information.

13. The method of claim 11, wherein the received communications stream includes one or more channels for participant communications, the one or more channels including at least one of:
a channel for text communications;
a channel for audio communications;
a channel for visual communications; and
a channel for multimedia communications.

14. The method of claim 13, wherein providing feedback to the particular participant includes providing feedback via a channel distinct from the one or more channels for participant communications.

15. The method of claim 13, wherein the received communications stream includes two or more channels for participant communications;
wherein analyzing the received communications stream includes analyzing each of the two or more channels; and
the method further comprises:
determining an optimal channel based on the analysis of each of the two or more channels; and
promoting the optimal channel to the first participant.

16. The method of claim 13, wherein the received communications stream comprises two or more channels including a first channel designated as a primary channel; and
the method further comprises, in accordance with a determination that the first channel is faulty, designating a second channel of the two or more channels as the primary channel.

17. The method of claim 11, wherein analyzing the received communications stream includes:
analyzing an audio stream within the received communications stream; and
determining at least a subset of the one or more quality factors based on the analyzed audio stream.

18. The method of claim 11, wherein analyzing the received communications stream includes:
analyzing a video stream within the received communications stream; and
determining at least a subset of the one or more quality factors based on the analyzed video stream.

19. The method of claim 11, wherein analyzing the received communications stream includes:
comparing an audio stream within the received communications stream with a video stream within the received communications stream; and
determining at least a subset of the one or more quality factors based on the comparison.

20. The method of claim 11, wherein analyzing the received communications stream includes analyzing at least one of:
a latency corresponding to the received communications stream;
a volume corresponding to the received communications stream; and
a refresh rate corresponding to the received communications stream.

* * * * *